US012749055B2

(12) United States Patent
Bell et al.

(10) Patent No.: US 12,749,055 B2
(45) Date of Patent: Sep. 29, 2026

(54) CENTRALIZED RESTAURANT MANAGEMENT

(71) Applicant: Block, Inc., Oakland, CA (US)

(72) Inventors: Bruce Bell, New York, NY (US); James Lintern, New York, NY (US); Brian Partridge, Brooklyn, NY (US); Ghassan Abu-Ghaida, New York, NY (US); Matthew T. Kursmark, Brooklyn, NY (US); Logan Johnson, Brooklyn, NY (US)

(73) Assignee: Block, Inc., Oakland, CA (US)

( * ) Notice: Subject to any disclaimer, the term of this patent is extended or adjusted under 35 U.S.C. 154(b) by 32 days.

(21) Appl. No.: 18/745,725

(22) Filed: Jun. 17, 2024

(65) Prior Publication Data

US 2024/0412183 A1 Dec. 12, 2024

Related U.S. Application Data

(63) Continuation of application No. 17/468,622, filed on Sep. 7, 2021, now Pat. No. 12,051,049, which is a (Continued)

(51) Int. Cl.
*G06Q 40/00* (2023.01)
*G06Q 10/087* (2023.01)
(Continued)

(52) U.S. Cl.
CPC ......... *G06Q 20/102* (2013.01); *G06Q 10/087* (2013.01); *G06Q 20/202* (2013.01); (Continued)

(58) Field of Classification Search
CPC .. G06Q 20/102; G06Q 10/087; G06Q 20/202; G06Q 50/12; G07F 9/02; G07F 17/40; H04L 51/222; G07G 1/0036
See application file for complete search history.

(56) References Cited

U.S. PATENT DOCUMENTS 5,262,938 A * 11/1993 Rapoport ............. G06Q 10/087 705/15
5,912,743 A * 6/1999 Kinebuchi ........... G06Q 20/202 434/428
(Continued)

FOREIGN PATENT DOCUMENTS

EP 2549725 A1 1/2013
TW 201604822 A 2/2016
(Continued)

OTHER PUBLICATIONS

Fujita et al., "Self-ordering System of Restaurants for Considering Allergy Information," IEEE Consumer Communications and Networking Conference, 2014 (Year: 2014).*
(Continued)

*Primary Examiner* — Abhishek Vyas
*Assistant Examiner* — William B. Bunker
(74) *Attorney, Agent, or Firm* — Lee & Hayes, P.C.

(57) ABSTRACT

Systems and methods for modifying a user interface of a device based on unavailability of an item offered for sale by a merchant are described. In examples, the techniques include receiving, by server(s) of a service provider, menu data indicating items offered for sale by the merchant. Based on the menu data, instructions that cause presentation of a user interface comprising icons corresponding to the items are sent by the server(s) to device(s) of a merchant and/or customer(s) of the merchant. The techniques further include the server(s) receiving an indication that one of the items is unavailable for sale by the merchant. Responsive to receiving the indication, instructions are sent by the server(s) to at least one of the devices, wherein the instructions cause presentation of a modified user interface that excludes from the user interface an icon corresponding to the unavailable item.

20 Claims, 11 Drawing Sheets

Related U.S. Application Data continuation of application No. 16/940,291, filed on Jul. 27, 2020, now Pat. No. 11,151,530, which is a continuation of application No. 15/279,782, filed on Sep. 29, 2016, now Pat. No. 10,762,482.

(51) Int. Cl.
*G06Q 20/10* (2012.01)
*G06Q 20/20* (2012.01)
*G07F 9/00* (2006.01)
*G07F 17/40* (2006.01)
*G07G 1/00* (2006.01)
*H04L 51/222* (2022.01)
*G06Q 50/12* (2012.01)

(52) U.S. Cl.
CPC .............. *G07F 9/002* (2020.05); *G07F 17/40* (2013.01); *G07G 1/0036* (2013.01); *H04L 51/222* (2022.05); *G06Q 50/12* (2013.01)

(56) References Cited

U.S. PATENT DOCUMENTS 6,088,681 A 7/2000 Coleman et al.
6,208,976 B1 * 3/2001 Kinebuchi ............. G06Q 20/20 705/16
7,680,690 B1 3/2010 Catalano
9,230,292 B2 1/2016 Amin et al.
9,299,102 B1 3/2016 Pike et al.
9,754,331 B1 9/2017 Beckelman et al.
9,858,597 B2 1/2018 DeWitt et al.
9,858,614 B2 1/2018 Seaward et al.
10,043,149 B1 8/2018 Iacono et al.
10,168,860 B1 1/2019 Bell et al.
10,169,837 B2 1/2019 Wilson et al.
10,423,298 B2 9/2019 Bell et al.
10,546,344 B2 1/2020 Bell et al.
10,762,482 B2 9/2020 Bell et al.
11,151,530 B2 10/2021 Bell et al.
2002/0174014 A1 11/2002 Wittrup
2002/0188492 A1 12/2002 Borton
2002/0188495 A1 12/2002 Banerjee et al.
2004/0158499 A1 * 8/2004 Dev ....................... G06Q 30/02 705/26.1
2004/0210621 A1 10/2004 Antonellis
2005/0030162 A1 2/2005 Stambaugh
2005/0182680 A1 * 8/2005 Jones, III ............... G06Q 50/12 705/15
2006/0235755 A1 * 10/2006 Mueller .................... G09F 9/35 705/15
2006/0241966 A1 10/2006 Walker et al.
2007/0060358 A1 3/2007 Amaitis et al.
2007/0106411 A1 5/2007 Huber-Buschbeck et al.
2008/0312987 A1 12/2008 Damodaran et al.
2008/0319864 A1 12/2008 Leet
2009/0048890 A1 2/2009 Burgh
2009/0259553 A1 * 10/2009 Carroll ................. G06Q 20/204 705/25
2010/0120538 A1 5/2010 DeWitt
2010/0125886 A1 5/2010 Qian et al.
2011/0029359 A1 2/2011 Roeding et al.
2011/0125689 A1 5/2011 Bernard et al.
2012/0115501 A1 5/2012 Zheng
2012/0173350 A1 7/2012 Robson
2012/0191522 A1 7/2012 Mclaughlin et al.
2012/0191551 A1 7/2012 Lutnick et al.
2013/0042296 A1 2/2013 Hastings et al.
2013/0054863 A1 2/2013 Imes et al.
2013/0130208 A1 * 5/2013 Riscalla ............. G06Q 30/0621 434/127
2013/0238451 A1 * 9/2013 Riscalla ................. G06Q 50/12 705/15
2013/0278631 A1 10/2013 Border et al.
2013/0317921 A1 * 11/2013 Havas ................ G06Q 30/0641 705/15
2013/0318458 A1 11/2013 Lyons et al.
2014/0074580 A1 3/2014 Khuchua-edelman et al.
2014/0100971 A1 * 4/2014 Klearman .......... G06Q 30/0641 705/15
2014/0136348 A1 5/2014 Carroll et al.
2014/0156431 A1 6/2014 Morgan et al.
2014/0171039 A1 6/2014 Bjontegard
2014/0188637 A1 7/2014 Balasubramaniam et al.
2014/0201655 A1 7/2014 Mahaffey et al.
2014/0214465 A1 7/2014 L'Heureux et al.
2014/0214534 A1 * 7/2014 L'Heureux ............ G06Q 50/12 705/14.64
2014/0257926 A1 9/2014 Rasband
2014/0351068 A1 11/2014 Renfroe
2015/0025983 A1 1/2015 Cicerchi
2015/0046297 A1 * 2/2015 Bahrami ............... G06F 3/0485 705/27.2
2015/0072663 A1 3/2015 Chande et al.
2015/0073925 A1 * 3/2015 Renfroe ............. G06Q 30/0641 705/15
2015/0081478 A1 3/2015 Bahrami et al.
2015/0127496 A1 5/2015 Marathe et al.
2015/0169034 A1 6/2015 Huang et al.
2015/0187027 A1 7/2015 Lowe
2015/0213547 A1 * 7/2015 Gomez-Rosado ........................... G06F 3/04842 705/27.2
2015/0262121 A1 9/2015 Riel-Dalpe et al.
2015/0262208 A1 9/2015 Bjontegard
2016/0012465 A1 1/2016 Sharp
2016/0026958 A1 1/2016 Lee
2016/0029160 A1 1/2016 Theurer et al.
2016/0078264 A1 3/2016 Armstrong et al.
2016/0171584 A1 6/2016 Cao
2016/0180033 A1 6/2016 Rosenberg
2016/0202851 A1 7/2016 Turner et al.
2016/0308798 A1 10/2016 Magistrado et al.
2016/0345176 A1 11/2016 DeWitt et al.
2017/0006429 A1 1/2017 Douglas et al.
2017/0055752 A1 3/2017 Mueller et al.
2017/0109843 A1 4/2017 Berg et al.
2017/0124670 A1 5/2017 Becker et al.
2017/0243195 A1 8/2017 Xing
2017/0255898 A1 9/2017 Thomas
2017/0278202 A1 9/2017 Mimassi
2017/0278204 A1 9/2017 Mimassi
2017/0287086 A1 10/2017 Lopez et al.
2017/0293950 A1 10/2017 Rathod
2017/0314981 A1 11/2017 Flockenhaus et al.
2017/0352017 A1 12/2017 Hay
2018/0268324 A1 9/2018 Zhang et al.
2018/0268328 A1 9/2018 Baggott et al.
2019/0035037 A1 1/2019 Chase et al.
2019/0213657 A1 7/2019 Malik
2022/0051206 A1 2/2022 Bell et al.

FOREIGN PATENT DOCUMENTS

WO WO-2006115984 A2 * 11/2006 ............. G06Q 30/06
WO 2008/087003 A1 7/2008
WO WO-2011124928 A1 * 10/2011 ............. G06Q 30/00
WO WO-2014052882 A2 * 4/2014 ........... G06Q 20/202
WO WO-2017061054 A1 * 4/2017 ............. G06Q 30/06
WO WO-2017180518 A1 * 10/2017 ......... G06Q 20/3278
WO 2018/063474 A1 4/2018

OTHER PUBLICATIONS

Roberto et al., "Improving the design of nutrition labels to promote healthier food choices and reasonable portion sizes," International Journal of Obesity 38, 525-533 2014 (Year: 2014).*
"Handheld ordering systems—The caterer", www.thecaterer.com/news, Apr. 26, 2005, 7 pages.
"Handheld restaurant POS: Efficient service is fast and responsive. What could be faster and more responsive than servicing your guests right at their tables?", Clock POS—Handheld POS for modern guest service, 2014, 9 pages.

(56) References Cited

OTHER PUBLICATIONS

Bhargave et al., "Digital Ordering System for Restaurant Using Android", International Journal of Scientific and Research Publications, vol. 3, Issue 4, Apr. 2013, 7 pages.
Geoff, "Benefits of Wireless Handheld Order Taking Systems for Restaurants", Access POS, Dec. 6, 2012, 5 pages.
Kanyan et al., "Improving the Service Operations of Fast-food Restaurants", Procedia Social and Behavioral Sciences, www.sciencedirect.com Aug. 11-15, 2015, 9 pages.
Lorri M., "How Do Successful Restaurants Operate?", www.thebalancesmb.com/restaurant-cooking-positions-2888534 2018, Year 2018, 10 pages.
Mccormack et al., "2D LIDAR as a Distributed Interaction Tool for Virtual and Augmented Reality Video Games", IEEE Games Entertainment Media Conference, Oct. 2015, pp. 1-5.
Statler S., "Our digital and physical worlds collide—beacons," Air Transport IT Review, Sita, pp. 1-6.
Woyke E., "How Stores Will Use Augmented Reality to Make You Buy More Stuff", MIT Technology Review, Jun. 17, 2016, pp. 1-4.

* cited by examiner

CENTRALIZED RESTAURANT MANAGEMENT

RELATED APPLICATIONS

This application is a continuation of and claims priority to U.S. patent application Ser. No. 17/468,622, filed Sep. 7, 2021, which is a continuation of and claims priority to U.S. patent application Ser. No. 16/940,291, filed Jul. 27, 2020, and issued as U.S. Pat. No. 11,151,530 on Oct. 19, 2021, which claims priority to U.S. patent application Ser. No. 15/279,782, filed Sep. 29, 2016, and issued as U.S. Pat. No. 10,762,482 on Sep. 1, 2020, which are incorporated herein in their entirety.

BACKGROUND

Mobile devices are ubiquitous in society today. Typically, mobile devices contain applications with user interfaces that allow users to conduct various activities on the mobile devices. For instance, a merchant may use a point-of-sale (POS) application on a mobile device, such as a mobile POS device, to engage in transactions with customers at various locations. In cases in which the merchant is a restaurant, the transactions may be orders for food, drinks, and the like. However, the user interfaces on applications are typically fixed, based on the application. For example, a merchant waiter may view the same user interface when taking an order at a bar or at a table in a dining room. Because of the fixed user interface, a processing time of each order may be significant due to a need to search through multiple layers of the user interface to find particular items relevant to the area or customer.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
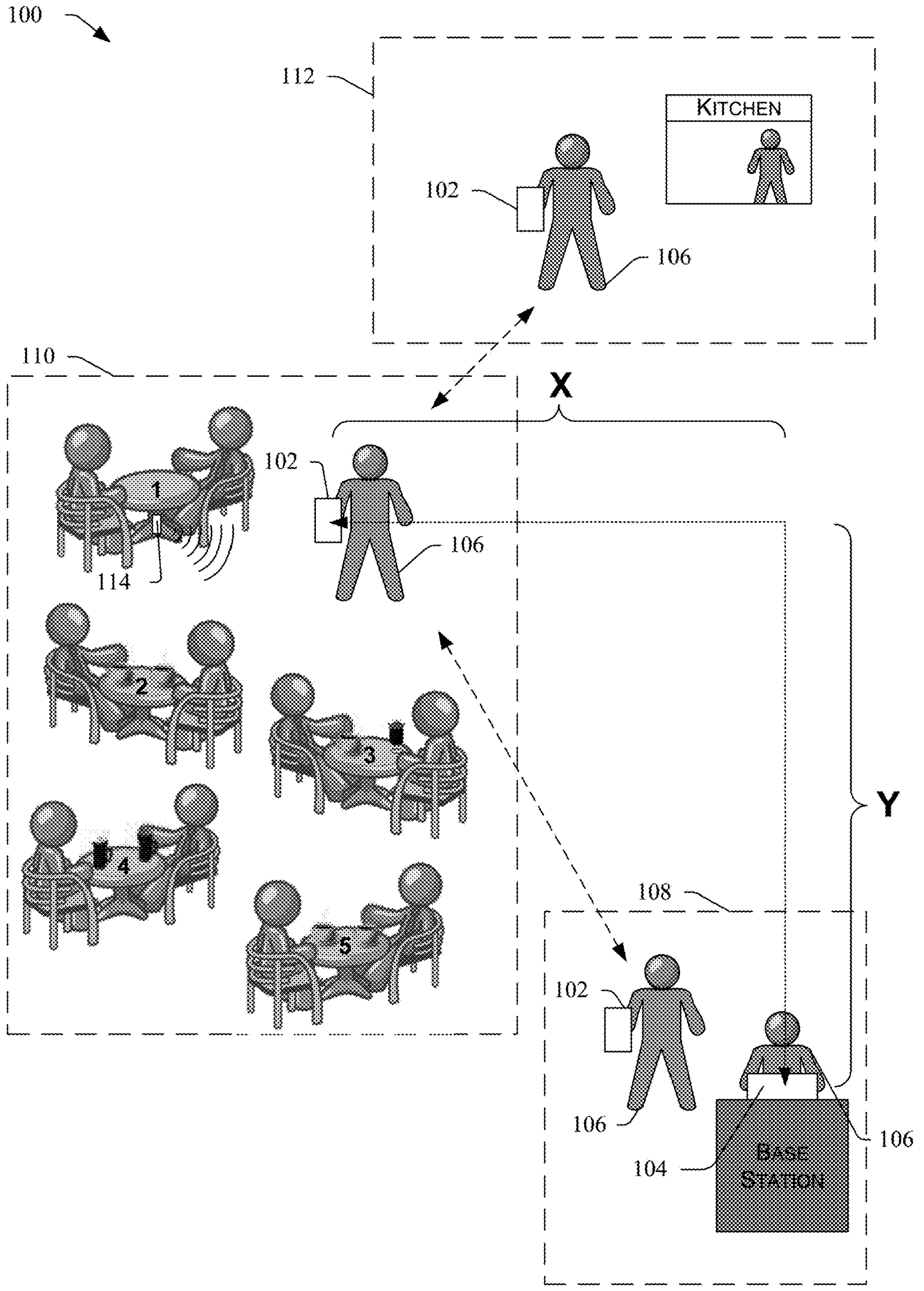
FIG. 1 illustrates an example environment including a service computing device of a POS system configured with a dynamically modifiable user interface.

Some implementations described herein include techniques and arrangements for dynamically modifying a user interface on a computing device of a point-of-sale (POS) system based on contextual data. The contextual data can include a location of the service computing device (e.g., a point-of-sale (POS) device), a time of day, a day of the week, merchant inventory, merchant preferences, customer preferences, items that are deemed upsell items, items that deemed cross-sell items, a sale and/or special offered by the merchant, and various other contextual factors corresponding to the use of the computing device.

In various examples, a service computing device can analyze the contextual data and dynamically modify icons (e.g., text and/or images corresponding to selectable items) of the user interface based on one or more contextual factors. A modification to the icons can include replacing icons with other icons and/or changing the size, shape, order, image, etc., of various icons. For example, a service computing device at a restaurant can determine that a current time corresponds to an adjustment to a lunch menu. Based on the determination, the service computing device can modify the icons on the user interface from icons associated with a breakfast menu to icons associated with a lunch menu.

In some examples, the modification to the icons can include an adjustment to a functionality of the user interface. The functionality can include one or more functions the user interface is capable of performing, such as data input, processing input, determining a status of previous inputs, automatically uploading data, automatically downloading data, and other functions relevant to the particular use of the user interface. For example, a computing device located in a restaurant dining area may display icons related to items on a menu, and when moved to a kitchen area of the restaurant, the computing device may display order information for multiple tables.

Additionally or alternatively, the computing device can modify a theme of the user interface based on contextual data. The theme can include background and/or icon hue (e.g., color and/or shading), background images, animations, lighting, sounds, and/or other sensory outputs. For example, a computing device located in a dimly lit dining area may present icons in a dark color on a dimly lit background. However, as the computing device is moved toward an outdoor patio area, the computing device may dynamically modify the icons to a lighter color, and may automatically increase a volume of the computing device.

In various examples, the modification to the user interface can be based on a location and/or distance of the service computing device relative to a base station computing device. The base station computing device can include a central computing device for one or more service computing devices. The central computing device can process orders, track customer and/or employee location, track order preparation times, monitor inventory, push updates to the one or more service computing devices, process payments, and/or perform other functions based on the implementation. For example, a service computing device can receive an order for a table in a restaurant dining area. After receiving the order, the waiter can deliver the service computing device to an area within a threshold distance of the base station. Based on a determination that the service computing device is within the threshold distance of the base station, the user interface on the service computing device can be modified to upload order information to the base station computing device. The base station computing device can then process the order information with other orders.

The dynamic modification to the user interface can result in a faster processing speed of each input. For example, a relevant menu to a particular customer can be surfaced automatically based on an indication of proximity to the particular customer. Due to the automatic surfacing of the relevant menu, the user of the device can quickly and efficiently input an order. The increased speed of the order input can result in excess processing power being available to the service computing device to perform other functions. Therefore, the dynamic modification to the user interface can improve the functioning of the service computing device itself.

Additionally or alternatively, the base station computing device can include a central computing device for one or more external ordering applications (e.g., delivery applications, such as food-delivery applications). In such examples, the base station computing device can process orders, track order preparation times, send order preparation times, promotions and/or specials to the external ordering applications, monitor inventory, update menus based on the inventory and/or order preparation times, process payments, and perform other functions based on the implementation. Traditionally, a designated computing device has been required to process information from a particular external ordering application. In many instances, the designated computing device is provided to the merchant from the particular external ordering application, to assist in processing orders. The base station computing device described herein can provide an improvement to the conventional processing of multiple orders from multiple external ordering applications by at least centralizing the order system and decreasing a number of computing devices required to processes the orders. Additionally, the base station computing device can receive the multiple orders and communicate the orders and/or a sequence thereof directly to a preparation computing device, thereby relieving the service computing device from processing the orders, and improving the amount of processing power available to the service computing device. The increase in processing power available can result in an increased processing speed of the service computing device. Thus, the employment of the base station computing device as the central computing device can include the technical benefit of improving the function of the base station computing device and/or the service computing device.

For discussion purposes, example implementations, such as a POS service computing device, are described below with reference to the corresponding figures. However, implementations herein are not limited to the POS service computing device. The techniques discussed herein may be extended to other environments, other system architectures, other types of applications, and so forth, as will be apparent to those of skill in the art in light of the disclosure herein. For example, the techniques discussed herein may be extended to use in hospitals, retail stores, warehouses, bowling alleys, museums, and/or any other implementation which could benefit from a dynamically modifiable user interface.

FIG. 1 illustrates an example environment 100 including a service computing device 102 (e.g., a point-of-sale (POS) device) of a POS system configured with a dynamically modifiable user interface. The POS system can include one or more service computing devices 102 and/or a base station computing device 104. The service computing device 102 and/or the base station computing device 104 can include any sort of mobile or non-mobile device operated by a merchant 106 (e.g. owner, employee, contractor, etc.) or a customer of the merchant 106 that includes an instance of a user interface modification framework to analyze contextual data and modify a user interface based on the contextual data. Contextual data can include a location of the service computing device, a time of day, a day of the week, time of year (e.g., season), weather, merchant inventory, merchant preferences, customer preferences, items that are deemed upsell items, items that are deemed cross-sell items, a sale and/or special offered by the merchant, and/or various other contextual factors corresponding to the use of the service computing device.

In various examples, the base station computing device 104 can analyze the contextual data, and can send updates to the service computing device 102 as necessary. For example, the base station computing device 104 can determine that an inventory of hamburger buns is running low. Based on the determination, the base station computing device 104 can send an update to the service computing device 102 to de-emphasize (e.g., understate by: adjusting placement on display, adjusting the icon to a smaller size, changing icon colors and/or hue, removing the icon from a main page, etc.) hamburgers on a menu user interface.

In some examples, the service computing device 102 can analyze the contextual data and modify the user interface accordingly. For example, the service computing device can determine that a block of time associated with a happy hour menu has started (e.g., 4 pm for a happy hour of 4-6 pm, etc.). Based on the determination, the service computing device can adjust the user interface to emphasize or highlight (e.g., adjust placement on display to a higher location, enlarge icon size, adjust icon colors and/or hue, adjust placement of icons in the menu, etc.) the happy hour menu.

In various examples, modifications to the user interface can include an adjustment to one or more icons (e.g., text and/or images corresponding to selectable items) of the user interface. The adjustment to the one or more icons can include replacing icons with other icons and/or changing the size, shape, order, image, color, hue, etc., of various icons. For example, a service computing device at a restaurant can determine that a current time corresponds to an adjustment to a lunch menu. Based on the determination, the service computing device can modify the icons on the user interface from icons associated with a breakfast menu to icons associated with a lunch menu. For another example, the service computing device at the restaurant can determine that a current day of the week corresponds to a menu special, such as Taco Tuesday. Based on the determination, the service computing device can modify the user interface to emphasize (e.g., highlight, etc.) the icons associated with Taco Tuesday items (e.g., tacos, chips and salsa, guacamole, margaritas, etc.).

In some examples, the modifications to the user interface can include an adjustment to a functionality associated with the user interface. As will be discussed in further detail below with regard to FIG. 4, the functionality can include surfacing different menus, notifications, selectable icons, and the like corresponding to different functions of the user interface (e.g., a menu item ordering system, a payment processing system, a recipe display system, a kitchen management system, a seating management system, an order preparation notification system, and the like). For example, a computing device located proximate to a table in a dining area of a restaurant may determine that an order associated with the table is complete (e.g., menu items associated with the order delivered and a pre-determined amount of time has passed since delivery to allow for item consumption). Based on the determination of order completion, the service computing device can automatically adjust the functionality of the user interface to process payment for the order, such as by modifying icons from those related to food menu items to those related to processing payment.

In some examples, the modifications to the user interface can include an adjustment to a theme associated with user interface. As will be discussed in further detail below with regard to FIG. 5, the theme can include background and/or icon hue (e.g., color and/or shading), background images, animations, lighting, sounds, and/or other sensory outputs. For example, a volume in a bar area of a restaurant may be greater than the volume in a dining area of the restaurant. Based on the environmental volume increase, the service computing device may increase a volume associated with the user interface upon entering the bar area, to ensure an operator of the service computing device can hear sounds associated with the user interface.

In various examples, the service computing device 102 can be configured to modify the user interface based on a location of the service computing device 102. In the illustrative example shown in FIG. 1, a merchant location can include a base station area 106, a dining area 108, and a kitchen area 110. In other examples, the merchant location can include a greater or lesser number of areas, including sub-sections of each area (e.g., dining area 1, dining area 2, table 1, table 2, etc.). For example, a retail store merchant location can include a storage area, a base station area, a shoe department area, a men's clothing area, a women's clothing area, and the like. Based on a determination that the service computing device 102 is located in a particular area, the service computing device 102 can adjust the user interface accordingly.

In some examples, the service computing device 102 can determine an area and/or sub-section of the area (e.g., particular location) in which it is located based on data from a sensor of the service computing device 102. The sensor can include a camera, a laser scanner, or another sensor. For example, the service computing device 102 can capture an image at the location via a camera, and can compare the image with stored images at various known locations. Based on a match of the image to an image of a known location, the service computing device 102 can identify a current location. For another example, the service computing device 102 can scan a code at a particular location via a laser scanner, and can identify the particular location based on the code.

In some examples, the service computing device 102 can determine an area and/or sub-section of the area in which it is located based on a location component of the service computing device 102. The location component can be a global positioning system (GPS) receiver, a beacon and/or components configured to receive beacon signals, a light detection and ranging system (LIDAR), a radio detection and ranging system (RADAR), a mobile communications triangulation subsystem, and the like. In various examples, the area and/or sub-section of the area can be defined by a geographic radius from a position in the area and/or sub-section of the area, a geo-fence around the area and/or sub-section of the area, or determining whether the service computing device can communicate with another device, such as the base station computing device 104, using a specified wireless technology, e.g., Bluetooth® or Bluetooth® low energy (BLE).

In some examples, the service computing device 102 can determine that it is located in a sub-section of the area (e.g., in proximity to a Table, such as Table 1) based on a signal from an external location component 114, such as a beacon. In such examples, the service computing device can receive the signal from the external location component 114, and based on the signal, determine that the service computing device 102 is proximate to the external location component 114. The determination can be based on a distance calculation, a signal strength, or other means by which the service computing device can determine a proximity to the external location component 114.

In various examples, the service computing device 102 may receive one or more signals from one or more external location components 114. In such examples, the service computing device 102 can determine a closest external location component 114 to a current location of the service computing device 102. The determination can be based on a comparison of a distance from each external location component, a ranking of the signal strength from each external location component, or other means by which the service computing device 102 can determine a closest external location component.

In some examples, the service computing device 102 can determine an area and/or a sub-section of the area in which it is located based on a signal from the base station computing device 104. In various examples, the service computing device 102 may receive the signal, and may calculate a horizontal distance X and/or a vertical distance Y from the base station computing device 104. In some examples, the base station computing device 104 may calculate the horizontal distance X and/or a vertical distance Y, and may provide the distance(s) to the service computing device 102. In some examples, the service computing device 102 and/or the base station computing device 104 may determine the area and/or sub-section of the area in which the service computing device 102 is located based on the horizontal distance X and/or a vertical distance Y. For example, the service computing device 102 may determine that the horizontal distance X and the vertical distance Y is associated with the dining area 110. Based on a determination that the service computing device 102 is located in the dining area 110, the service computing device may modify the user interface to display icons related to food and/or beverage menu items. For another example, the service computing device 102 may determine that the horizontal distance X and the vertical distance Y is associated with a particular table, such as Table 1, in the dining area 108. Based on a determination that the service computing device 102 is proximate to Table 1, the service computing device 102 may modify the user interface to surface icons relevant to Table 1, such as icons related to dessert menu items after the customers located at Table 1 have consumed entrées.

In various examples, the service computing device 102 can be configured to modify the user interface based on merchant inventory. In some examples, the service computing device 102 can store and track inventory data, such as in a data store of the service computing device 102. In some examples, the service computing device can receive inventory data from the base station computing device 104. In such examples, the base station computing device 104 can push updates to the service computing device continuously or periodically (e.g., at a certain time each day, every two hours, etc.). In some examples, the base station computing device 104 can push an update to the service computing device 102 based on a determination that a particular item in the inventory has traversed (e.g., crossed over, etc.) an overstock threshold level. A traversal of an overstock level can include an exceedance of the overstock threshold level or a reduction below the overstock threshold level. The overstock threshold level may be set by the merchant, such as in merchant preferences, and/or by the POS system. For example, the service computing device 102 may determine that a particular item is overstocked. Based on the overstock determination, the service computing device 102 may modify the user interface to emphasize the overstocked item in an attempt to sell more of that item.

In some examples, the base station computing device 104 can push an update to the service computing device 102 based on a determination that a particular item in the inventory has traversed an understock threshold level. A traversal of an understock level can include an exceedance of the understock threshold level, reaching the understock threshold level (e.g., if the understock threshold level is zero), or a reduction below the understock threshold level. The understock threshold level could be zero remaining items, or a limited quantity (e.g., number) of remaining items, as determined by the merchant 106 and/or the POS system. For example, the service computing device 102 may determine that a particular item is understocked (e.g., a limited amount or none remaining). Based on the understock determination, the service computing device 102 may modify the user interface to de-emphasize (e.g., understate, etc.) the understocked item in an attempt to discourage the sale of the item.

In various examples, the service computing device 102 can be configured to modify the user interface based on an attempt to cross-sell an item (e.g., sell a different item than the customer expressed an interest in). In such examples, the service computing device 102 may emphasize the one or more items to cross-sell on the user interface. In some examples, a modification based on an attempt to cross-sell can be based on the inventory, such as if the inventory of an item has decreased below the threshold level.

In various examples, the service computing device 102 can be configured to modify the user interface based on an attempt to upsell an item. In such examples, the merchant 106 can attempt to persuade the customer to purchase something additional or more expensive than another option. For example, the service computing device 102 can adjust a size, color, and/or position of an icon to upsell. In some examples, the service computing device 102 can determine what item to attempt to upsell based on known popular combinations of items. In such examples, the known popular combinations can be stored in a data store of the service computing device 102, the base station computing device 104, and/or provided by the POS system service provider. For example, a customer may order a burrito for an entrée. The service computing device 102 may analyze the popular combinations and determine that many customers also order chips and salsa with the burrito. Based on the determination of a popular combination, the service computing device may modify the user interface to display a large icon associated with chips and salsa in the center of the user interface.

In some examples, the service computing device 102 can be configured to modify the user interface based on merchant preferences. The merchant preferences can be stored in a merchant profile on the service computing device 102, the base station computing device 104, and/or a POS system service provider device. The merchant preferences can include scheduled sales and/or specials (e.g., happy hour dates and times, food and/or beverage specials, etc.), user interface adjustments based on time of day and/or day of week, inventory management information (e.g., overstock threshold level, understock threshold level, etc.), merchant location area information (e.g., specified areas at the merchant location, information about external location component 114 signals, etc.), area specific data (e.g., functionality, theme, icons, etc., associated with each area), employee preferences (e.g., settings associated with a particular employee of the merchant operating the service computing device, such as most commonly sold items by the employee, handedness of employee, desired font size, etc.), and the like.

As will be discussed in greater detail below with regard to FIG. 2, the service computing device 102 can additionally or alternatively be configured to modify the user interface based on customer preferences.

Figure 2:
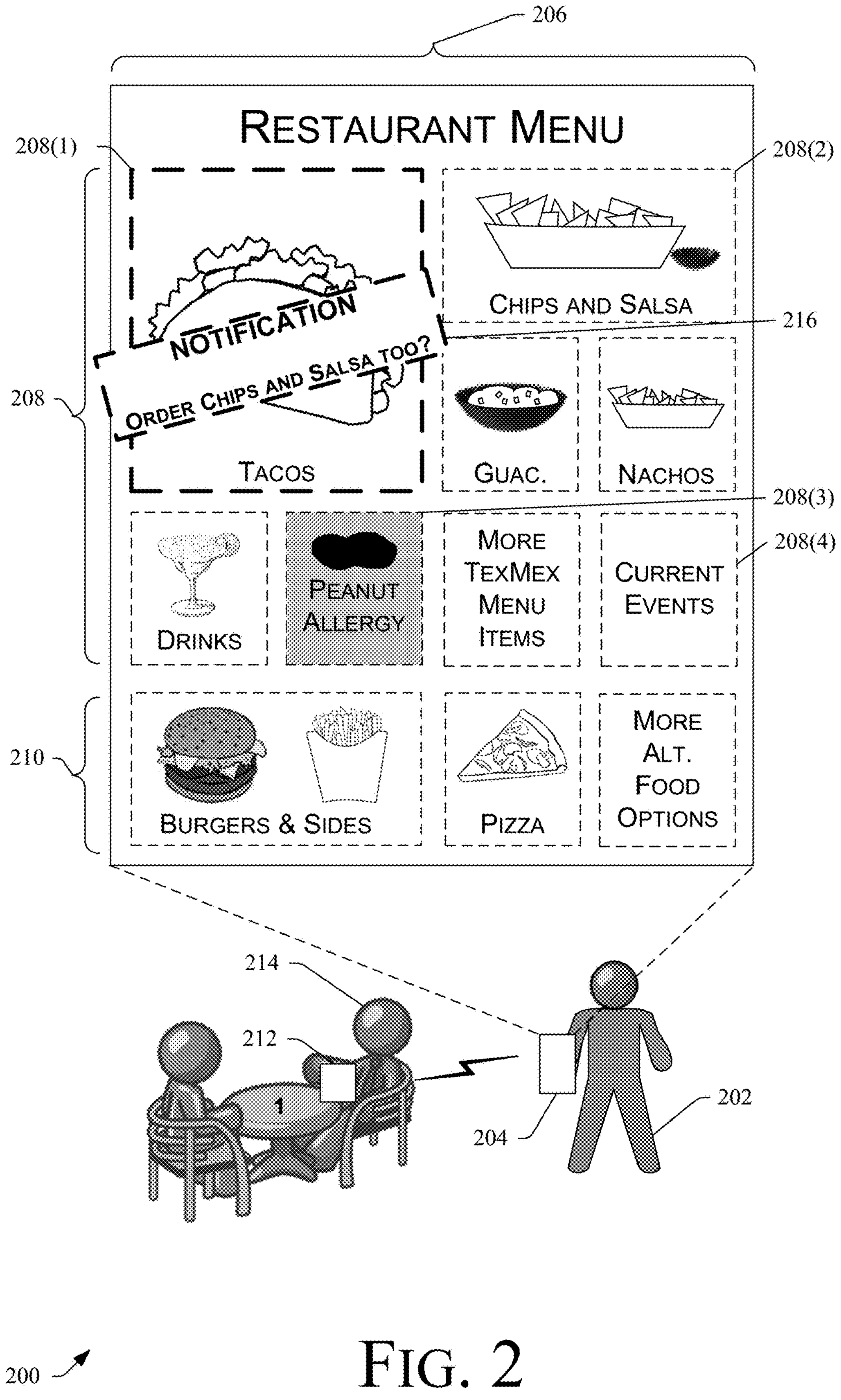
FIG. 2 illustrates an example environment with a merchant operating a service computing device configured with a dynamically modifiable user interface.

FIG. 2 illustrates an example environment 200 with a merchant 202, such as merchant 106, operating a service computing device 204, such as service computing device 106, configured with a dynamically modifiable user interface 206. Although illustrated as being operated by the merchant 202, in some examples, the service computing device 204 may additionally or alternatively be operated by a customer. In various examples, the user interface 206, such as that discussed above with regard to FIG. 1, can include one or more icons, such as icons 208 and/or 210. The one or more icons 208 and/or icons 210 can be modifiable, such as in size, placement, color and/or hue, image, text, and the like, to emphasize and/or de-emphasize corresponding items.

In the illustrative example, the icon 208(1) is emphasized by the size of the icon and placement on the top left corner of the user interface 206. As discussed above, the icon 208(1) can be modified (e.g., emphasized or de-emphasized) based a location of the service computing device 204, merchant inventory, merchant preferences, an attempt to upsell, an attempt to cross-sell, a sale and/or special (e.g., a discount on the corresponding item) offered by the merchant, a time of day, a day of the week, and/or various other contextual factors corresponding to the merchant 202 associated with the service computing device 204. For example, the merchant 202 may have a Taco Tuesday special from 5 pm-10 pm every Tuesday. The service computing device 204 can determine that a current date and time correspond to the Taco Tuesday special. Based on the determination that the date and time correspond to the special, the service computing device 204 can dynamically modify the user interface 206 to emphasize Taco Tuesday items, such as icons 208.

In various examples, the icons 208 and icons 210 to be presented can be pre-defined by the merchant, such as in merchant preferences. In some examples, the icons 208 and icons 210, can be based on known popular items. In such examples, the known popular items can be determined based on a merchant transaction history. The merchant transaction history can be a history of transactions while a sale and/or special is ongoing, on a given day, over a week, a month, and/or over another period of time. In various examples, the merchant transaction history can be a history of transactions with a particular customer. In some examples, the merchant transaction history can be stored in a data store of the service computing device 204. In some examples, the merchant transaction history can be stored in a base station computing device, and/or a POS system service provider computing device, and provided to the service computing device 204.

In some examples, the merchant transaction history can include known popular combinations of items (e.g., items that are complementary to one another, pair well together, etc.). For example, it can be determined that a large quantity (e.g., number) of customers who select icon 208(1) and order tacos also select icon 208(2) and order chips and salsa. Based on the known combination, the service computing device can modify a size and/or placement of the icon 208(2), to emphasize the chips and salsa in an attempt to upsell the customer (e.g., persuade the customer to purchase an additional item). In various examples, based on the known combination, the icon 208(2) corresponding to chips and salsa can be surfaced on the user interface 206 responsive to a taco selection via the icon 208(1) (represented by a bold border surrounding the icon 208(1)). In such examples, the icon 208(2) corresponding to the complementary item to the item selected can replace one or more other icons 208, or it can be presented as a notification 216 responsive to selection of the icon 208(1).

In various examples, the merchant transaction history can also include popular alternative food options, presented as icons 210. Using the above Taco Tuesday example, the transaction history can track purchases outside of the Taco Tuesday menu, and determine the most popular alternate food options, illustrated as icons 210. In some examples, the size and/or shape of the most popular alternate food item may be modified for emphasis. As an illustrative example, the burgers and sides, displayed as the largest alternate food option icon 210, is the most popular alternate food item, followed by pizza.

Still further, the transaction history may be based on one or more other merchants utilizing the same payment processing system. For instance, transaction history associated with merchants having similar classification code and location may be used to determine popular items for a given merchant at a given time of day.

Additionally or alternatively, the merchant transaction history can include a status of a current transaction with a particular customer. In various examples, the service computing device can determine that the particular customer is currently on at a second stage of the current transaction (e.g., a second course). In some examples, the service computing device 204 can identify an elapsed time since the merchant was proximate to the particular customer (e.g., a last time the merchant checked-in at the customer's table). In various examples, based on a determination that the elapsed time has exceeded a threshold amount of time (e.g., 10 minutes, 20 minutes, etc.), the service computing device 204 can cause a notification 216 to display and remind the merchant to check-in with the particular customer. In such examples, the threshold amount of time may be set based on the status of the current transaction. For example, a threshold amount of time set for a customer to consume an entrée may be longer than the threshold amount of time set for the customer to consume an hors d'oeuvre. The threshold amount of time could also vary given the actual food item ordered (e.g., steak may longer to consume than small piece of salmon), size of the party, and/or age profile associated with the customers in the party.

In various examples, the service computing device 204 can modify the user interface 206 based on customer preferences. In some examples, the customer preferences can be stored in a customer profile on the service computing device 204. In other examples, the customer preferences can be stored in a customer profile on a remote device, such as the base station computing device, the POS system service provider computing device, and/or a customer computing device 212, and communicated to the service computing device via a network. The customer computing device 212 can include any type of mobile computing device (e.g., mobile phones, tablet computers, mobile phone tablet hybrids, personal data assistants (PDAs), laptop computers, media players, personal video recorders (PVRs), cameras, and any other mobile computers or any other mobile telecommunication devices), embedded devices (e.g., wearable computers, implanted computing devices, automotive computers, computer navigation type devices, such as satellite-based navigation systems including global positioning system (GPS) devices and other satellite-based navigation system devices, appliances, and integrated components for inclusion in a computing device), and/or any other type of computing device configured to communicate via a network.

The network can include any type of wired and/or wireless network, such as local area networks (LANs), wide area networks (WANs), personal area networks (PANs) (e.g., Bluetooth®, etc.), body area networks (BANs), near field communication (NFC), satellite networks, cable networks, Wi-Fi networks, WiMax networks, mobile communications networks (e.g., 3G, 4G, and so forth) or any combination thereof. The network can utilize communications protocols, including packet-based and/or datagram-based protocols such as internet protocol (IP), transmission control protocol (TCP), user datagram protocol (UDP), or other types of protocols. Moreover, the network can also include a number of devices that facilitate network communications and/or form a hardware basis for the networks, such as switches, routers, gateways, access points, firewalls, base stations, repeaters, backbone devices, and the like.

In various examples, the service computing device 202 can determine that it is in proximity to the customer computing device 212 associated with a customer 214. In some examples, the service computing device 204 can determine a proximity to the customer computing device 212 based on a customer check-in at a particular location associated with the merchant 202. In some examples, the customer check-in can be performed automatically by an application running on a background of the customer computing device 204 when the customer computing device 204 is within a predetermined distance of a merchant location, and/or an area/sub-section of the area associated with the merchant location. In such examples, the customer computing device 204 may access a location component on the device, and determine that the customer 214 has entered the merchant location, and/or an area/sub-section of the area associated with the merchant location. The customer computing device 204 can then automatically send an indication of proximity and/or a check-in notification to the merchant 202, via an automatic check-in. In some examples, the automatic check-in can also be performed by the application running as a background process on the customer computing device 212. In some examples, the application running as a background process removes the need to run the application on a main thread of the processor of the customer computing device 212, thereby saving processing speed and increasing efficiency on the main thread of the customer computing device 212 processor.

In various examples, the customer check-in can be performed by the customer 214 deliberately checking-in via an application on the customer computing device 212. In some examples, the customer can check-in to the service computing device 204, such as by inputting a customer identification code into the service computing device 204 or sending a message via the network from the customer computing device 212 to the service computing device 204. For example, the customer 214 can check-in at Table 1 at the merchant location. The service computing device 204 can determine that it is within a threshold distance to Table 1, and consequently within proximity to the customer 214 and/or customer computing device 212. For another example, a customer 214 could check-in to a hospital, and could be placed in a particular room within the hospital. The service computing device 204 could determine a proximity to the customer 214 responsive to crossing a threshold into the particular room.

In some examples, the service computing device 204 can determine a proximity to the customer computing device 212 based on a signal from the customer computing device 212. In such examples, the customer computing device can emit a signal identifying the customer computing device 212. In some examples, the signal may include customer profile data, such as a code specific to the customer 214. In various examples, the service computing device 204 may determine a proximity based on signal strength. In some examples, the service computing device 204 may determine a proximity based on positioning data embedded in the signal, such as a particular position in an area and/or sub-section of the area of the merchant location.

In various examples, based on a determination of proximity between the service computing device 204 and the customer 214 and/or the customer computing device 212, the service computing device 204 can modify the user interface 206 according to one or more customer preferences. In some examples, the customer preferences can be based on a customer transaction history with the merchant. In such examples, the customer preferences can be determined based on commonly purchased items, commonly purchased combinations, etc.

In various examples, the customer preferences can be defined by the customer 214. Customer preferences can include favorite items, most commonly purchased items, allergies, dietary restrictions (e.g., vegetarian, vegan, etc.), customer transaction history, desired icon size (e.g., increased font size for customer with bad eyesight), and the like. For example, the customer 214 may prefer TexMex food items prepared by the merchant 202. As such, the service computing device 204 may dynamically modify the restaurant menu to prominently display the TexMex items, such as icons 208. Using the hospital example above, the customer 214 may have a severe allergy to penicillin. Based on the allergy, the service computing device 204 can prominently display in a large icon, similar to icon 208(1), the allergy, to ensure penicillin is not administered to the patient.

In various examples, one or more icons corresponding to customer preferences can be emphasized on the user interface 206. In such examples, the emphasis can include a different size, shape, color and/or hue of the icon as compared to other icons. In the illustrative example, icon 208(3) represents a peanut allergy of the customer, emphasized by a different color than the other icons 208 and 210.

In some examples, the customer preferences can include preferred conversation topics. In such examples, the merchant 202 may be able to refer to the icon 208(4) to facilitate a conversation between the merchant and the customer 214, thereby enhancing the customer's overall experience with the merchant. In some examples, the icon 208(4) and/or another icon 208 or icon 210 may include customer information, such as a customer name, birthday, and the like. In such examples, the merchant 202 may access the customer's information, and refer to the customer by name, further enhancing the customer's overall experience with the merchant. In various examples, the icon 208(4) and/or another icon 208 or icon 210 can include previously submitted feedback regarding the customer's experience. In such examples, the merchant 202 may be able to access and address the feedback with the customer 214, to further enhance the customer experience.

In some examples, based on a determination of proximity between the service computing device 204 and the customer 214 and/or the customer computing device 212, the service computing device 204 can modify the user interface 206 according to a current ongoing transaction (e.g., a particular meal the customer is consuming, etc.). In such examples, the service computing device 204 can determine that the customer 214 has completed a first stage of the ongoing transaction, and can modify one or more icons to reflect items for a second stage of the ongoing transaction. For example, the service computing device 204 can determine that the customer has consumed an entrée. The determination that the entrée has been consumed can be based on a pre-determined amount of time that has passed since the entrée was ready for delivery and/or delivered to the customer. Based on the determination of entrée consumption and proximity to the particular customer, the service computing device 204 can dynamically modify icons 208 and/or icons 210 to icons corresponding to dessert menu items.

Figure 3:
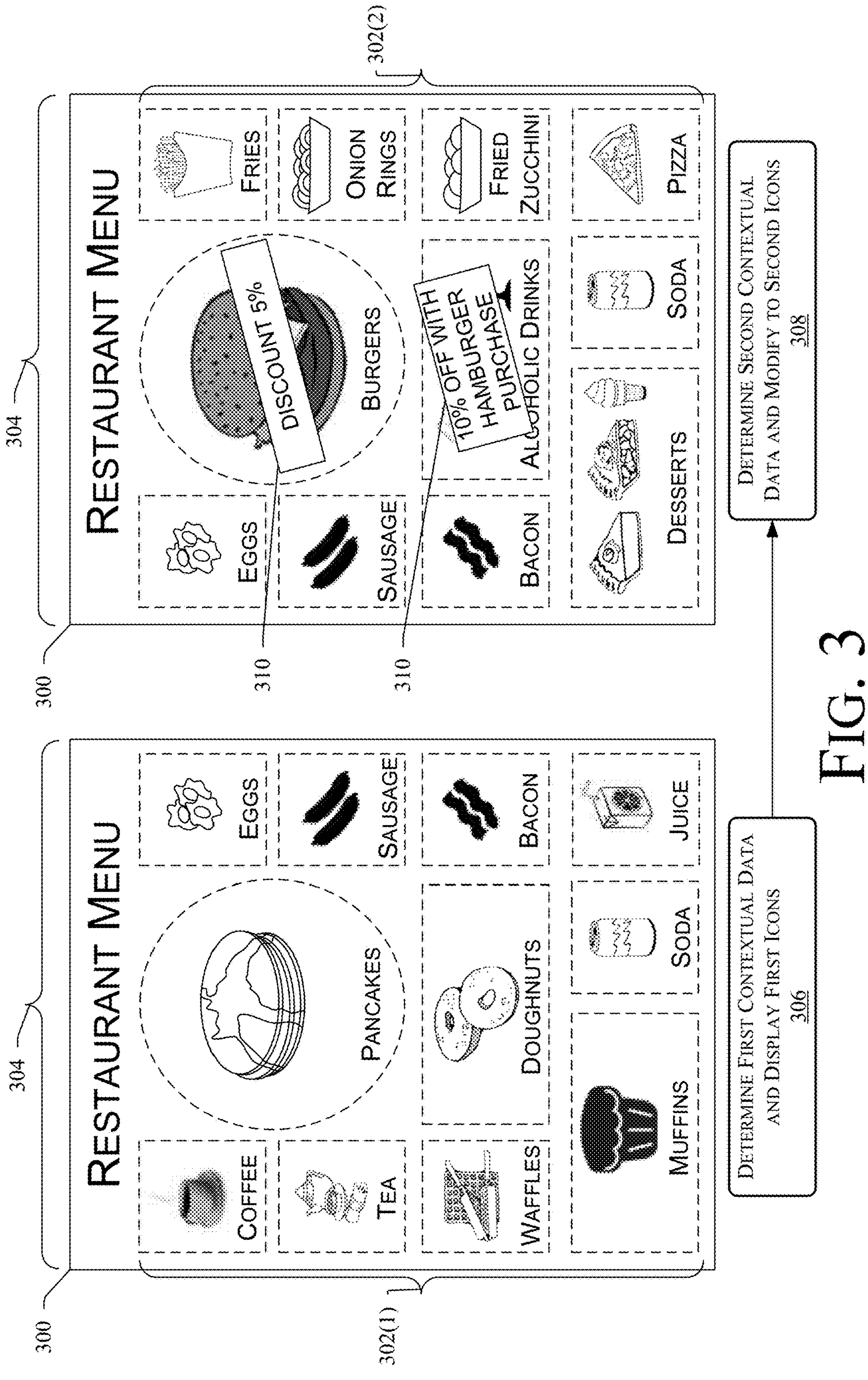
FIG. 3 illustrates an example process of a service computing device dynamically modifying icons of a user interface based on contextual data.

FIG. 3 illustrates an example process of an example service computing device 300, such as service computing device 102 and 204, dynamically modifying icons 302 of a user interface 304, such as user interface 206, based on contextual data. Contextual data can include a location of the service computing device 300, a time of day, a day of the week, time of year (e.g., season), weather, merchant inventory, merchant preferences, customer preferences, items that are deemed upsell items, items that are deemed cross-sell items, a sale and/or special offered by the merchant, and various other contextual factors corresponding to the use of the service computing device 300.

At 306, the service computing device 300 determines first contextual data and displays first icons 302(1) based on the contextual data. The first contextual data can be determined based on an analysis of one or more factors corresponding to the use of the service computing device 300. In the illustrative example, the analysis can include a determination that a time of day corresponds to a breakfast menu. Based on this determination, the service computing device 300 can display a first set of icons 302(1) corresponding to the breakfast menu. In some examples, the analysis can include an analysis of customer preferences, and a determination that the customer prefers particular menu items, such as the breakfast menu.

In various examples, the analysis can include a determination to emphasize one or more items. The emphasis can be presented by increasing a size, shape, color and/or hue of the icon 302, changing a placement of the icon 302, or any other adjustments to make the icon 302 stand out on the display. The emphasis can be based on merchant inventory, current weather, an attempt to upsell an item, an attempt to cross-sell an item, sales and/or specials offered by the merchant, transaction history of the merchant (e.g., known popular items sold at a time of day, a day of the week, time of year (e.g., season), known popular combinations of items sold, etc.

In some examples, the analysis can include a determination to de-emphasize one or more items. A de-emphasis of an item can be based on merchant inventory, current weather, an attempt to cross-sell, and/or other factors in which the merchant may discourage the sale of a particular item. The de-emphasis can be presented by removing the icon 302 corresponding to the one or more items from the display page. In various examples, the user interface 304 can include multiple display pages. In some examples, the de-emphasis can be presented by including the icon corresponding to the one or more items on a display page other than a main display page. For example, the de-emphasis can include presenting the icon on a last page of the multiple display pages.

In various examples, the service computing device 300 can dynamically determine to emphasize and/or de-emphasize one or more items based on contextual factors. For example, if a customer orders the last muffin, the service computing device 300 can dynamically modify the user interface 304 by removing the muffin icon from the user interface, and replace it with a pastry icon.

At 308, the service computing device 300 determines second contextual data and displays second icons 302(2) based on the contextual data. In various examples, the second contextual data can include a change in the time of day from a time corresponding to the breakfast menu to a time corresponding to a lunch menu. In some examples, the second contextual data can include a determination of an event nearby the merchant location, or displayed on a screen at the merchant location, which could affect menu items most likely to be ordered by customers. In such examples, the service computing device 300 could dynamically modify the icons 302(1) to a second set of icons 302(2) to cater to the customer preferences or external environment (e.g., cold/hot day recommend hot/cold beverage items). For example, a merchant may typically adjust from a breakfast to a lunch menu at 11 am. However, the service computing device 300 may determine that a football game starts at 10 am, and during football games, the customers prefer to consume items on the lunch menu. Accordingly, the service computing device 300 may adjust one or more of the icons 302 to those corresponding to lunch menu items.

In some examples, the service computing device 300 may determine that an event is taking place nearby the merchant or will be presented on a display screen at the merchant location, and may generate one or more sales and/or specials (e.g., discounts, etc.) based on the event. In such examples, the service computing device 300 can emphasize the icons 302 corresponding to the one or more specials. For example, the merchant may offer hamburgers and alcoholic beverages on special during the event. Accordingly, the service computing device 300 can modify the icons corresponding to the hamburgers and alcoholic beverages to make them stand out. Additionally or alternatively, the service computing device may display a notification 310 that the particular items are offered at a discounted price to further incentivize the purchase.

Figure 4:
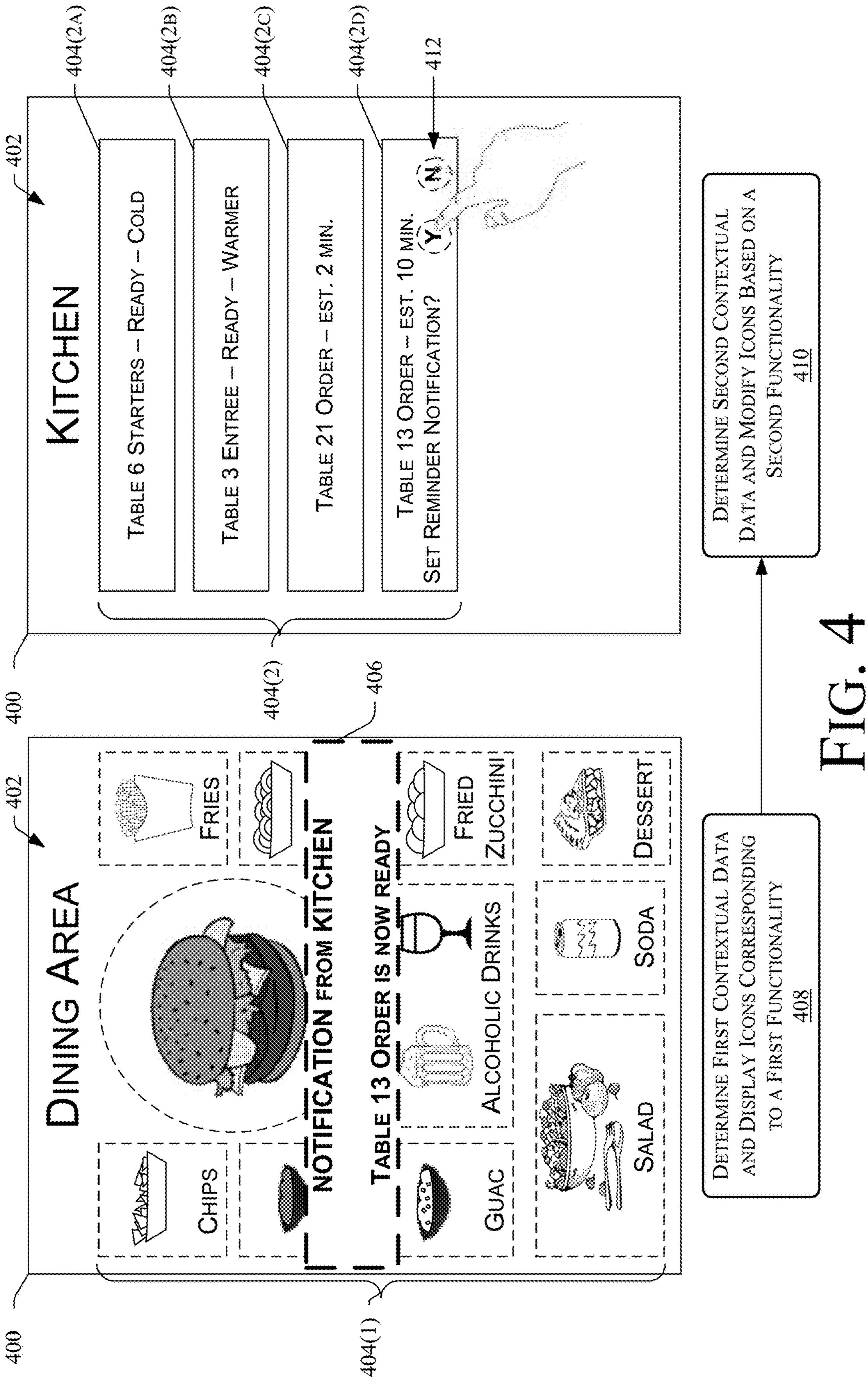
FIG. 4 illustrates an example process of a service computing device dynamically modifying a functionality of a user interface based on contextual data.

FIG. 4 example process of an example service computing device 400, such as service computing device 300, dynamically modifying a functionality of a user interface 402, such as user interface 304, based on contextual data (e.g., one or more contextual factors). A functionality can include one or more functions the user interface 402 is capable of performing, such as data input (e.g., order entry, etc.), data display (e.g., recipe display, discount notifications, order status notifications, etc.), status of previous inputs (e.g., order management, order status, etc.), data processing (e.g., payment processing, order processing, order sequencing, etc.), automatically uploading data (e.g., from a base station computing device based on a determination of proximity (e.g., order upload in order processing system, etc.), from a customer computing device based on a determination of proximity (e.g., uploading customer preference data, etc.)), automatically downloading data (e.g., to a base station computing device based on a determination of proximity, to a customer computing device based on a determination of proximity), and/or other functions relevant to the particular use of the user interface 402. In various examples, the modification to the functionality can be illustrated as a modification to the icons 404 corresponding to the functionality. In such examples, the modification to the functionality can include surfacing icons 404 related to the functionality, surfacing notifications 406 relevant to the functionality, and the like.

At 408, the service computing device 400 can determine first contextual data and display icons 404(1) corresponding to a first functionality. In various examples, the first contextual data can include a location of the service computing device. The location can be a merchant location, an area and/or a sub-section of an area of the merchant location. In various examples, the location can be determined by one or more sensors of the service computing device 400. In some examples, the location can be determined by a location component of the service computing device 400. The location component can be a global positioning system (GPS) receiver, a beacon and/or components configured to receive beacon signals, a light detection and ranging system (LIDAR), a radio detection and ranging system (RADAR), a mobile communications triangulation subsystem, and the like. In various examples, the area and/or sub-section of the area can be defined by a geographic radius from a position in the area and/or sub-section of the area, a geo-fence around the area and/or sub-section of the area, or determining whether the service computing device can communicate with another device, such as the base station computing device, using a specified wireless technology, e.g., Bluetooth® or Bluetooth® low energy (BLE).

In some examples, the service computing device 400 can determine that it is located in a sub-section of the area (e.g., in proximity to a Table, such as Tables 1-5) based on a signal from an external location component, such as a beacon. In such examples, the service computing device 400 can receive the signal from the external location component, and based on the signal, determine that the service computing device 400 is proximate to the external location component. The determination can be based on a distance calculation, a signal strength, or other means by which the service computing device can determine a proximity to the external location component.

In various examples, the service computing device 400 can determine that it is in proximity to a customer computing device associated with a customer. In some examples, the service computing device 400 can determine a proximity to the customer computing device based on a customer check-in at a particular location associated with the merchant. In some examples, the customer check-in can be performed automatically by an application running on a background of the customer computing device when the customer computing device 204 is within a predetermined distance of a merchant location, and/or an area/sub-section of the area associated with the merchant location. In such examples, the customer computing device determines that it has entered the merchant location, and/or an area/sub-section of the area associated with the merchant location based on a location component. The customer computing device can then automatically send an indication of proximity and/or a check-in notification to the merchant, via an automatic check-in. In some examples, the automatic check-in can also be performed by the application running as a background process on the customer computing device. In some examples, the application running as a background process removes the need to run the application on a main thread of the processor of the customer computing device, thereby saving processing power and/or speed, and increasing efficiency on the main thread of the customer computing device processor.

In various examples, the customer check-in can be performed by the customer deliberately checking-in via an application on the customer computing device. For example, the customer can check-in at Table 1 at the merchant location. The service computing device 400 can determine that it is within a threshold distance to Table 1, and consequently within proximity to the customer and/or customer computing device. For another example, a customer can check-in to a hospital, and be placed in a particular room within the hospital. The service computing device 400 can determine a proximity to the customer responsive to crossing a threshold into the particular room.

In some examples, the service computing device 400 can determine a proximity to the customer computing device based on a signal from the customer computing device. In such examples, the customer computing device can emit a signal identifying the customer computing device. In some examples, the signal may include customer profile data, such as a code specific to the customer. In various examples, the service computing device may determine a proximity based on signal strength. In some examples, the service computing device 400 may determine a proximity based on positioning data embedded in the signal, such as a particular position in an area and/or sub-section of the area of the merchant location.

In various examples, based on a determination of proximity between the service computing device 400 and the customer computing device, the service computing device 400 can display icons 404 corresponding to a first functionality, based on one or more customer preferences. In some examples, the customer preferences can be based on a customer transaction history with the merchant. In such examples, the customer preferences can be determined based on commonly purchased items, commonly purchased combinations, previously used payment instrument information, etc. For example, the service computing device 400 may determine a proximity to a particular customer corresponding to a customer profile. The service computing device 400 may access the customer preferences in the customer profile and determine that the customer prefers to order alcoholic beverages from the merchant. Based on the determination of the customer preferences, the service computing device 400 may display icons corresponding to a bar menu functionality, including instructions on how to mix particular beverages.

In some examples, the customer preferences can be defined by the customer. In such examples, the customer can input one or more preferences into a customer profile. For example, the customer can input preferred payment instrument information, to allow for automatic payment processing.

In various examples, the first contextual data can include a status of a particular customer and/or a customer in a particular area and/or sub-section of the area. The status of the customer can include an order history (e.g., what the customer has ordered, consumed, etc.), completion of a transaction (e.g., the particular customer has paid for the meal, etc.), and the like. In various examples, the service computing device 400 can first determine that it is located proximate to a particular sub-section. Responsive to the location determination, the service computing device 400 can display icons corresponding to a first functionality based on the customer status at the particular location. For example, the service computing device 400 can determine that it is proximate to Table 1 and the customer at Table 1 has consumed the ordered items (e.g., a predetermined period of time has passed since order delivery). Based on the determination of the contextual factors of location and customer status, the service computing device 400 can automatically and dynamically modify the functionality of the user interface 402 to display icons corresponding to a bill for the customer and/or process payment for the bill. In examples in which the service computing device 400 identifies a proximity to a customer associated with a customer profile, the service computing device 400 can automatically process payment based on stored payment instrument information, and display icons corresponding to the processed payment. In such examples, the service computing device 400 can provide a seamless payment experience for the customer, and improve an overall experience between the customer and the merchant.

In various examples, the first functionality can include the function of displaying notifications 406 relevant to the first contextual data. In the illustrative example, the first contextual data includes a location of the service computing device in a dining area of a restaurant, such as dining area 110. The first functionality, therefore, can include a display of a menu of selectable icons 404(1), to enable the merchant to take an order from a table. As illustrated, the service computing device 400 may receive a notification from the kitchen including an indication that a particular order is ready for pick-up. Based on the indication, the merchant can adjust a next action, and retrieve the order from the kitchen to deliver to the table.

In some examples, the user interface 402 can be configured to process and display notifications when operating in multiple functionalities. In such examples, the user interface 402 can alert the merchant of important information regardless of the current contextual data and/or current task being performed by the merchant.

In various examples, the first contextual data can include a current time component. The time component can include a time of day, a day of the week, a month of the year, a season, or other time-based component. In such examples, the service computing device can determine the time component, and adjust the functionality of the user interface based at least in part on the time component. In some examples, the time component may be pre-defined, such as in merchant preferences stored in a merchant profile. For example, a particular merchant may pre-define a kitchen closing time as 10 pm. Based on a determination that the time is 10 pm, the service computing device 400 may adjust the functionality of the user interface 402 to display and process the bar menu, regardless of a location of the service computing device in the restaurant.

At 410, the service computing device 400 can determine second contextual data and dynamically modify icons 404 based on a second functionality corresponding to the second contextual data. The second contextual data, similar to the first contextual data, can be based on a location of the service computing device 400, a status of a customer at a particular location, a proximity to a particular customer, and/or other contextual factors related to the functionality of the service computing device 400.

In the illustrative example, the second contextual data includes a location of the service computing device in a kitchen area of the restaurant. Responsive to a location determination, the service computing device 400 can modify icons 404 from the dining area icons 404(1) to the kitchen area icons 404(2), based on the second functionality.

In various examples, the second contextual data can include a threshold amount of time (e.g., 5 seconds, 10 seconds, 1 minute, etc.) the service computing device 400 is located in an area and/or a sub-section of the area. In such examples, the service computing device 400 determines that the threshold time has been exceeded prior to modifying the icons 404 to those corresponding to the second functionality. For example, a merchant carrying a service computing device 400 into the kitchen area to quickly retrieve an order may not exceed the threshold time required to modify the icons 404.

In various examples, the first and/or second functionality can include one or more icons 404(2A)-404(2D) that are selectable, non-selectable, or include selectable components. For example, icons 404(2A) and 404(2B) include non-selectable icons 404, informing the merchant that particular orders are ready to be delivered to particular tables. For another example, icon 404(2D), includes a selectable component 412. In some examples, the selectable component 412 can include a notification 406 setting. In the illustrative example, the second functionality can include an estimated time in which a particular order will be ready. Based on the estimated time, the icons 404(2) can be modified to include a reminder notification query. In some examples, the reminder notification query can be presented based on the estimated time exceeding a threshold (e.g., 5 minutes, 10 minutes, 15 minutes, etc.). As illustrated, the merchant can receive a notification 406 from the kitchen responsive to answering the reminder notification query of the selectable component 412 in the affirmative.

Figure 5:
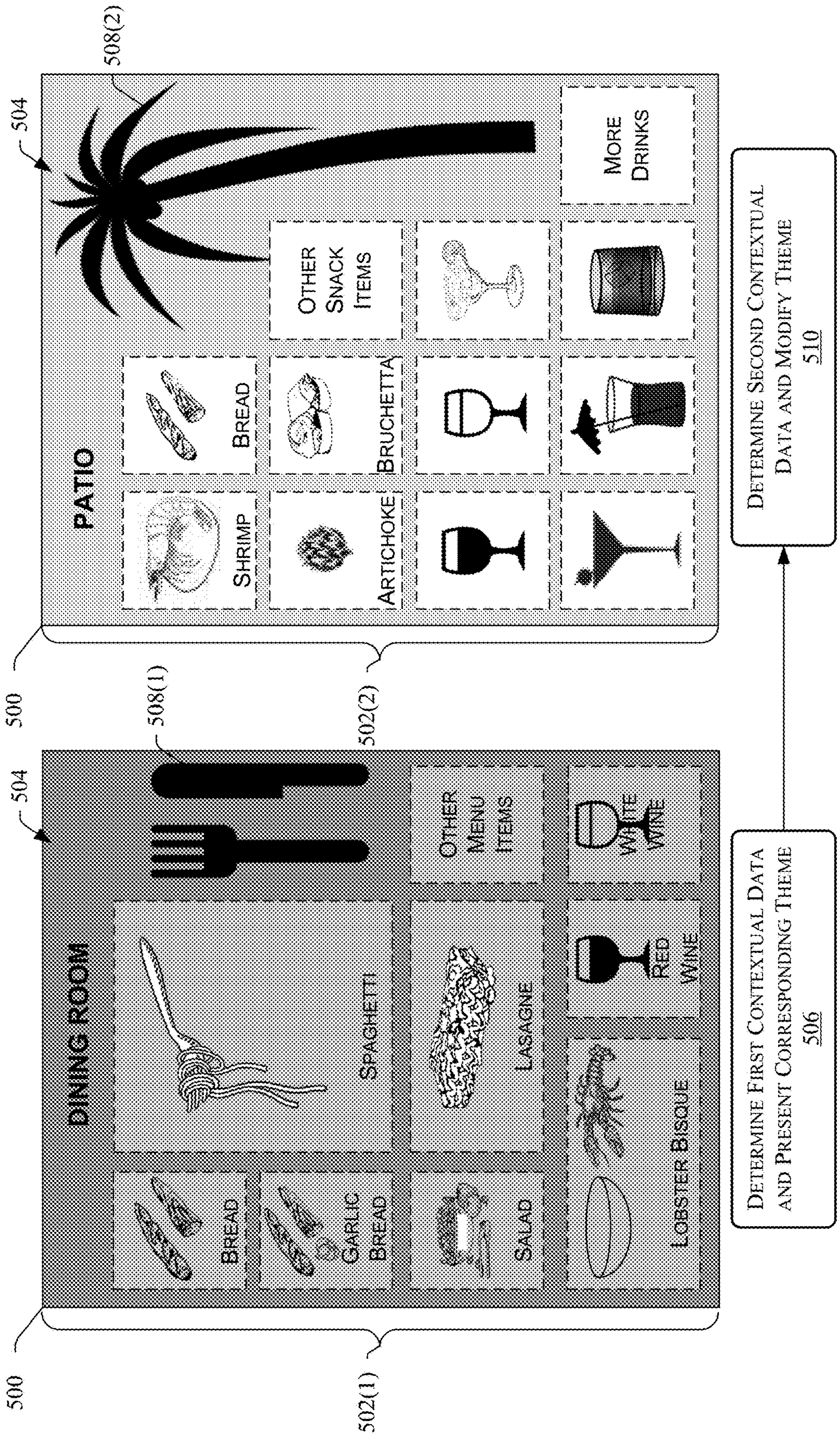
FIG. 5 illustrates an example process of a service computing device dynamically modifying a theme of a user interface based on contextual data.

FIG. 5 illustrates an example process of a service computing device 500, such as service computing device 400, dynamically modifying a theme 502 of a user interface 504, such as user interface 402, based on contextual data (e.g., one or more contextual factors). The theme 502 can include background and/or icon hue (e.g., color and/or shading), background images, animations, lighting, sounds, and/or other sensory outputs.

In various examples, the contextual data can include a location of the service computing device 500. As discussed above, the service computing device 500 can determine that it is located in an area and/or a sub-section of the area (e.g., in proximity to a Table, such as Table 1) based on data from one or more sensors, an internal location component and/or an external location component.

In some examples, the contextual data can include proximity to a particular customer. In such examples, the service computing device 500 can determine that it is within a threshold distance of the customer based on a customer check-in to an area and/or sub-section of the area associated with the merchant, a signal received from a customer computing device, and/or other ways of determining proximity between devices. In various examples, based on a determination of proximity to a particular customer, the service computing device can modify a theme 502 based on customer information and/or customer preferences. In such examples, the customer information and/or customer preferences can be stored in the customer profile. The customer information and/or customer preferences can include customer name, birthday, handedness (e.g., right-handed or left-handed), hobbies, preferred seasons, preferred holidays, preferred sports teams, meal preferences, and other information pertinent to the customer. For example, a customer can update a profile to reflect that the customer is a Mariners fan. Based on the update and a determination that the customer and the service computing device are in proximity to one another, the service computing device 500 can present a Mariners theme 502 on the user interface 504.

In some examples, the contextual data can include a time component. The time component can include a time of day, a day of the week, time of year (e.g., season), a holiday period, and the like. In various examples, the service computing device 500 can determine the time component, and present a theme 502 on the user interface 504 based at least in part on the time component. In some examples, the time component may be pre-defined, such as in merchant preferences stored in a merchant profile. For example, a particular merchant may include a preference to present snowflakes on the background of the user interface 504 during the winter. Based on a determination that the current season is winter, the service computing device 500 may adjust the theme 502 to include snowflakes in the background.

In some examples, the contextual data can include environmental factors. The environmental factors can include lighting, weather, volume, etc. In various examples, the service computing device 500 can user one or more sensors (e.g., light sensor, volume sensor, etc.) to determine the environmental factors. In such examples, based on the environmental factors, the service computing device 500 can present a particular theme 502. For example, in a dimly lit area, the service computing device 500 may adjust a background of the user interface 504 to a darker color. For another example, in a loud area, the service computing device 500 may increase a volume of the user interface 504.

At 506, the service computing device 500 can determine first contextual data and can present a corresponding theme 502. In the illustrative example, the first contextual data can include a location in a dimly lit dining room. Based on the first contextual data, the service computing device 500 can present theme 502(1) including an image 508(1) corresponding to the dining room, and dark colors for the user interface 504 and icon backgrounds corresponding to the area lighting.

At 510, the service computing device 500 can determine second contextual data and can dynamically modify the theme 502 based on the second contextual data. In the illustrative example, the second contextual data includes a location in a brightly lit patio. Based on the second contextual data, the service computing device 500 can present theme 502(2), including an image 508(2) corresponding to the patio, and bright colors for the user interface 504 and icon backgrounds corresponding to the brightly lit area.

FIGS. 6-9 illustrate flow diagrams of processes for generating multi-merchant loyalty programs and enrolling customers therein. Processes 600, 700, 800, and 900 are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems.

Figure 6:
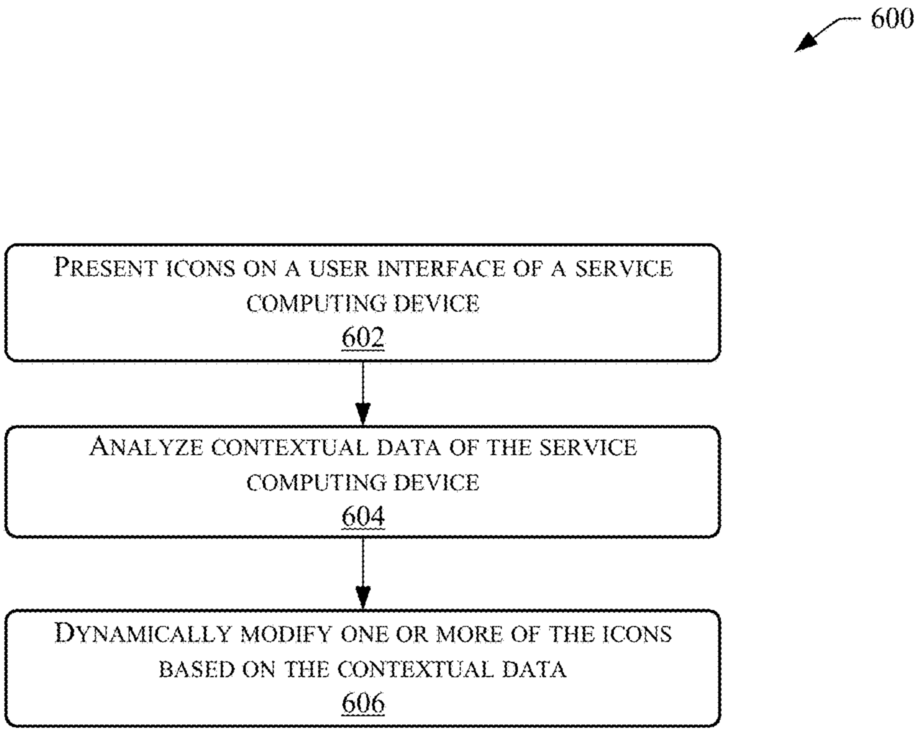
FIG. 6 illustrates a flow diagram of an example process for dynamically modifying icons a user interface of a service computing device based on contextual data.

FIG. 6 illustrates a flow diagram of an example process 600 for dynamically modifying icons on a user interface of a service computing device based on contextual data.

At 602, the service computing device can present icons on the user interface of a service computing device. In some examples, the icons can include selectable representations of items provided and/or offered by a merchant via the user interface. In various examples, the icons can correspond to a functionality of the user interface. For example, a user interface can be used to manage a seating chart in a restaurant. The icons can thus correspond to different tables in a dining area. For another example, the user interface can be used to process orders in a restaurant. The icons can thus correspond to selectable menu items.

In various examples, the icons and/or the size, shape, color, hue, placement, etc., thereof can be determined based on an initial setting of the service computing device. For example, a merchant can turn the service computing device on, and the service computing device can present a standard menu display with equally sized icons ordered alphabetically.

At 604, the service computing device can analyze contextual data of the service computing device. The contextual data can include a location of the service computing device, a time component (e.g., a time of day, a day of the week, time of year (e.g., season)), weather, merchant inventory, merchant preferences, customer preferences, items that are deemed upsell items, items that are deemed cross-sell items, a sale and/or special offered by the merchant, and/or various other contextual factors corresponding to the use of the service computing device.

In various examples, the service computing device can receive contextual data from a remote computing device, such as a base station computing device and/or a POS system service provider. For example, the service computing device can receive merchant preferences from a base station computing device, and can determine the icons to present based on the merchant preferences.

At 606, the service computing device can dynamically modify one or more icons based on the contextual data. In various examples, a modification to the one or more icons can include replacing an icon with another icon and/or changing the size, shape, order, image, color, hue, placement, etc., of an icon (e.g., adjusting a visual appearance of the icon). For example, a service computing device at a restaurant can determine that a current time corresponds to an adjustment to a lunch menu. Based on the determination, the service computing device can modify the icons on the user interface from icons associated with a breakfast menu to icons associated with a lunch menu. For another example, the service computing device at the restaurant can determine that a current day of the week corresponds to a menu special, such as Thirsty Thursday. Based on the determination that it is Thirsty Thursday, the service computing device can modify the user interface to emphasize the icons associated with Thirsty Thursday items (e.g., discounted beer, rum, tequila, whiskey, etc.).

In various examples, the modifications to the one or more icons can include an adjustment to a functionality associated with the user interface. The functionality can include surfacing different menus, notifications, selectable icons, and the like. In some examples, the modifications to the one or more icons can include an adjustment to a theme associated with user interface. The theme can include background and/or icon hue (e.g., color and/or shading), icon animation, background lighting, sounds, and/or other sensory outputs.

Figure 7:
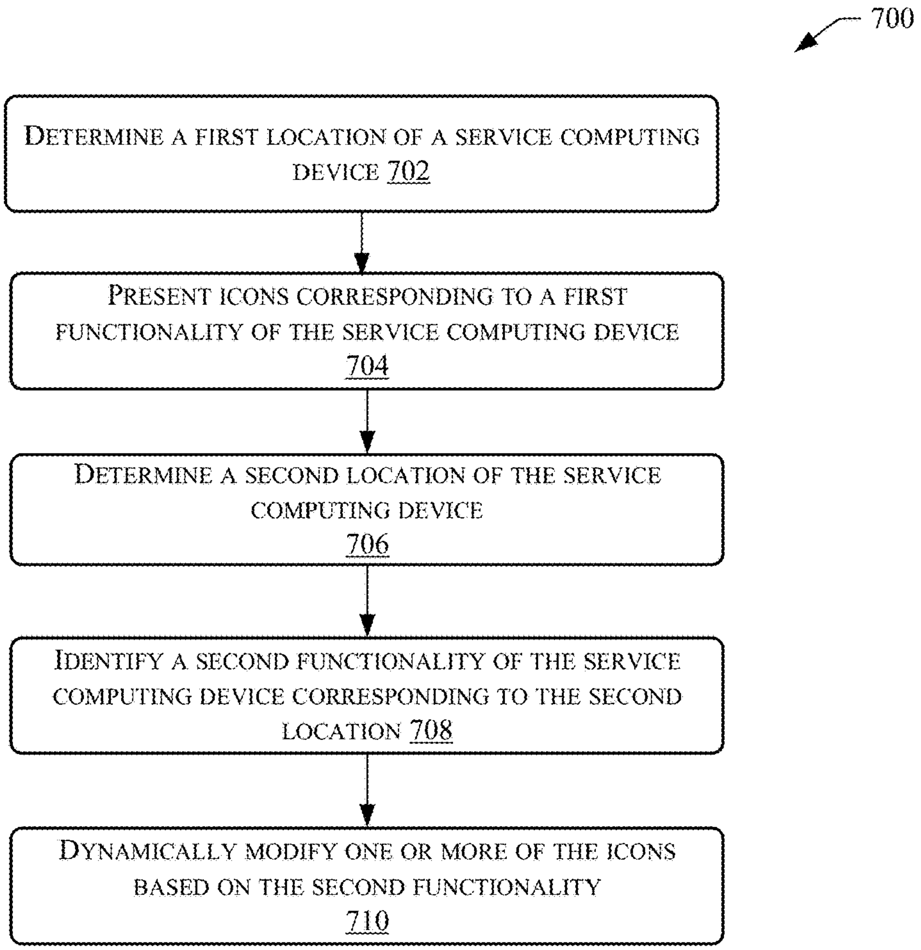
FIG. 7 illustrates a flow diagram of an example process for dynamically modifying a functionality of a user interface of a service computing device based on contextual data.

FIG. 7 illustrates a flow diagram of an example process 700 for dynamically modifying a functionality of a user interface of a service computing device based on contextual data.

At 702, the service computing device can determine a first location. In various examples, the first location can be determined based on a location component of the service computing device. In some examples, the first location can include a location relative to a base station computing device. In such examples, the first location can be a distance from a base station computing device of a point-of-sale (POS) system, such as a two-dimensional distance (e.g., X/Y distance) from the base station computing device. In some examples, the first location can include an area and/or a sub-section of an area corresponding to a merchant location.

In various examples, the service computing device can also determine one or more contextual factors associated with a use of the service computing device. The one or more contextual factors can include a time of day, a day of the week, time of year (e.g., season), weather, merchant inventory, merchant preferences, customer preferences, items that are deemed upsell items, items that are deemed cross-sell items, a sale and/or special offered by the merchant, and/or various other contextual factors corresponding to the use of the service computing device.

In various examples, the service computing device can receive the one or more contextual factors from a remote computing device, such as a base station computing device and/or a POS system service provider.

At 704, the service computing device can present icons corresponding to a first functionality on a user interface of a service computing device. The functionality can include one or more functions or capabilities of the service computing device at the first location and/or at a given time. For example, for a service computing device in a restaurant, the functions can include surfacing menus, displaying notifications, receiving orders, processing payment, managing customer flow at tables, managing a kitchen ordering system, automatically uploading data, automatically downloading data, and the like.

At 706, the service computing device can determine a second location. In various examples, the first location can be determined based on a location component of the service computing device. In some examples, the second location can include a location relative to a base station computing device. In such examples, the second location can be a distance from a base station computing device of a point-of-sale (POS) system, such as a two-dimensional distance (e.g., X/Y distance) from the base station computing device. In some examples, the second location can include an area and/or a sub-section of an area corresponding to a merchant location.

In various examples, the service computing device can also determine one or more contextual factors associated with a use of the service computing device. The one or more contextual factors can include a time of day, a day of the week, time of year (e.g., season), weather, merchant inventory, merchant preferences, customer preferences, items that are deemed upsell items, items that are deemed cross-sell items, a sale and/or special offered by the merchant, and/or various other contextual factors corresponding to the use of the service computing device.

In various examples, the service computing device can receive the one or more contextual factors from a remote computing device, such as a base station computing device and/or a POS system service provider.

At 708, the service computing device can identify a second functionality based on the second location. The second functionality can include one or more functions or capabilities of the service computing device relevant to the context of use. In various examples, the second functionality can also be based, at least in part, on the one or more contextual factors.

At 710, the service computing device can dynamically modify one or more icons of the user interface based on the second functionality. A modification to the one or more icons can include replacing an icon with another icon and/or changing the size, shape, order, image, color, hue, placement, etc. of an icon. For example, a service computing device at a restaurant can be relocated from a host station with a first functionality of managing a seating chart, to a dining area with a second functionality of receiving orders from customers. Based on the recognition of the change in contextual data and consequently functionality, the service computing device may modify the icons to display icons corresponding to a restaurant menu.

Figure 8:
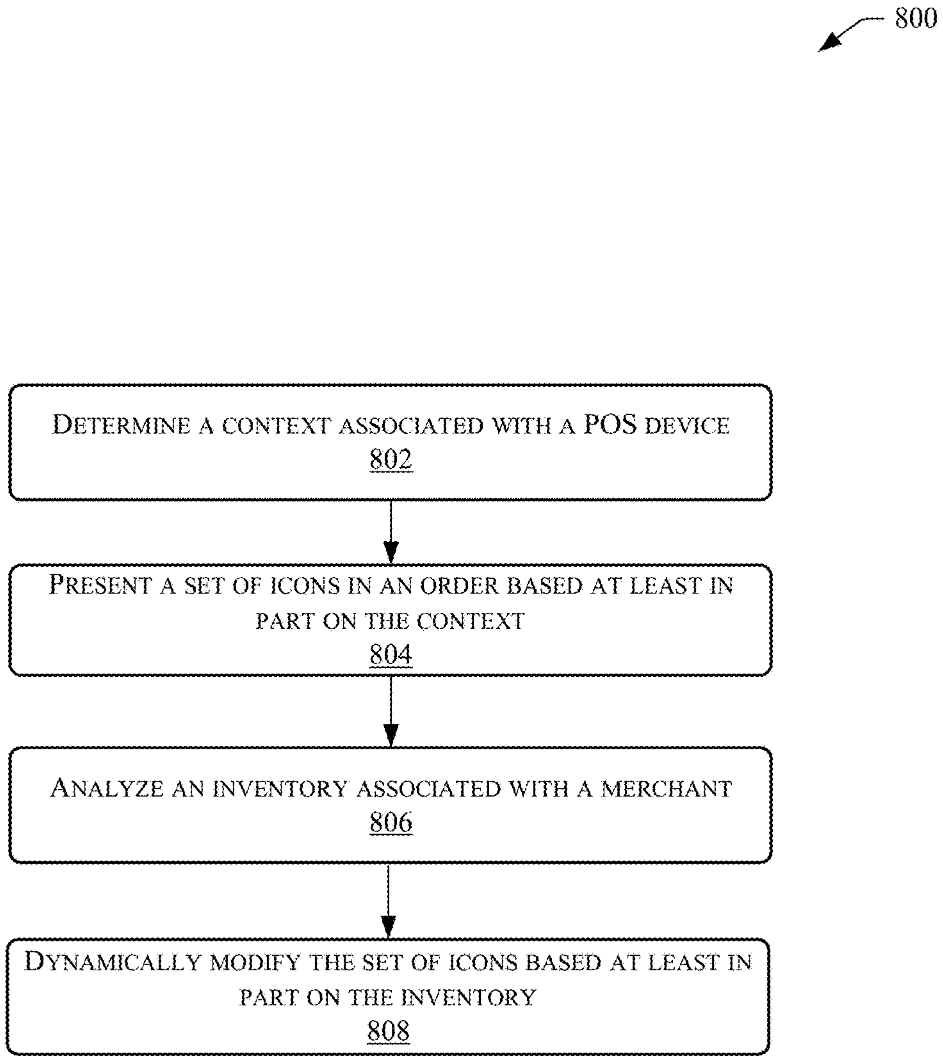
FIG. 8 illustrates a flow diagram of an example process for dynamically modifying icons on a user interface of a service computing device based on a merchant inventory.

FIG. 8 illustrates a flow diagram of an example process 800 for dynamically modifying icons on a user interface of a service computing device based on a merchant inventory.

At 802, the service computing device can determine a context corresponding to the use of the device. In various examples, the context can include one or more contextual factors, such as a location of the service computing device, a time component (e.g., a time of day, a day of the week, time of year (e.g., season)), weather, merchant inventory, merchant preferences, customer preferences, items that are deemed upsell items, items that are deemed cross-sell items, a sale and/or special offered by the merchant, and/or various other contextual factors corresponding to the use of the service computing device.

In various examples, the service computing device can receive contextual data from a remote computing device, such as a base station computing device and/or a POS system service provider. For example, the service computing device can receive merchant preferences from a base station computing device, and can determine the icons to present based on the merchant preferences.

At 804, the service computing device can present a set of icons in an order based at least in part on the context. In some examples, the icons can include selectable representations of items provided and/or offered by a merchant via the user interface. In various examples, the icons can correspond to a functionality of the user interface. For example, a user interface can be used to manage a seating chart in a restaurant. The icons can thus correspond to different tables in a dining area. For another example, the user interface can be used to process orders in a restaurant. The icons can thus correspond to selectable menu items.

In various examples, the icons and/or the size, shape, color, hue, placement, etc., thereof can be determined based on an initial setting of the service computing device. For example, a merchant can turn the service computing device on, and the service computing device can present a standard menu display with equally sized icons ordered alphabetically.

At 806, the service computing device can analyze an inventory associated with the merchant. An analysis of the inventory can include a determination of a quantity (e.g., number) of each item in the inventory that is available, a determination of icons associated with each item (e.g., menu item #13 includes items A, B, and C, menu item #26 includes items D and E, etc.). In various examples, the inventory can include a threshold overstock number and/or a threshold understock number for each item in the inventory. In some examples, based on the quantity of an item depleting below the threshold understock number, the service computing device can order the item from an item supplier. In various examples, the service computing device can send a notification of the item depletion to a centralized computing system, such as a base station computing device. In such examples, the service computing device can cause the centralized computing system to order the item from the supplier.

In various examples, the service computing device can receive inventory data from a remote computing device, such as a base station computing device and/or a POS system service provider. For example, the base station computing device can include a centralized order hub and inventory management system. The base station computing device can track a quantity of each item in the inventory, and can send updates to the service computing device as necessary. The updates can be continuous, periodic, or situationally dependent, and can determine the icons to present based on the merchant preferences.

In some examples, the service computing device can send the remote computing device order information. In such examples, the remote computing system can process the order, analyze the inventory based on the order, and send inventory information to the service computing device.

At 808, the service computing device can dynamically modify the set of icons based at least in part on the inventory. In various examples, the service computing device can process orders and determine an overstock or understock of a particular item of inventory. In some examples, the service computing device can receive inventory information, such as an item overstock or understock, from a remote computing device, such as the base station computing device.

In various examples, the service computing device can determine an overstock of an item of inventory. In such examples, the service computing device can dynamically modify an icon associated with the overstocked item, to emphasize the item and encourage a sale. The emphasis can include increasing a size, shape, color, hue, placement, and the like, of the icon, presenting a notification of a discount, etc.

In some examples, the service computing device can determine an understock of an item of inventory. In such examples, the service computing device can dynamically modify an icon associated with the understocked item, to de-emphasize the item and discourage a sale. The de-emphasis can include removing the icon from a user interface, removing the icon from a main page of the user interface, replacing the icon with an icon corresponding to another item that is substantially similar, and other ways to discourage the sale of an item.

In some examples, the service computing device can modify the set of icons based on one or more contextual factors, such as a location of the service computing device, a merchant preference, a customer preference, a time component, a merchant transaction history, a customer transaction history, a sale or special for an item, and the like. For example, the service computing device can identify a customer and access a transaction history associated with the customer. The service computing device can determine, from the transaction history, that a customer commonly purchases a particular item. The service computing device can identify one or more substantially similar items to the particular item, and can emphasize the icons corresponding to the substantially similar items (e.g., adjust the size, shape, placement, color, hue, etc.) to encourage a sale of one or more of the substantially similar items. In some examples, the identification of the substantially similar items can be based on a low quantity (e.g., an understock) of the particular item in the inventory.

The dynamic modification of the user interface based on an analysis of the inventory can improve a functioning of the service computing device. The improvements can include decreasing a number of inputs required to process each order, thereby increasing a processing speed of the service computing device, rendering the service computing device more efficient. Additionally, the inventory analysis described herein can improve the technology and/or technical field of inventory supply management. In various examples, the service computing device can continually and/or periodically update the inventory with the processing of each order (e.g., update a data structure, database, etc. associated with the inventory). In such examples, the inventory supply management system is greatly improved because the system can determine, in substantially real-time, what the inventory for a particular item is. Accordingly, the inventory supply management system can quickly determine an overstock situation, an understock situation, and/or one or more items to include in an order from a supplier.

Figure 9:
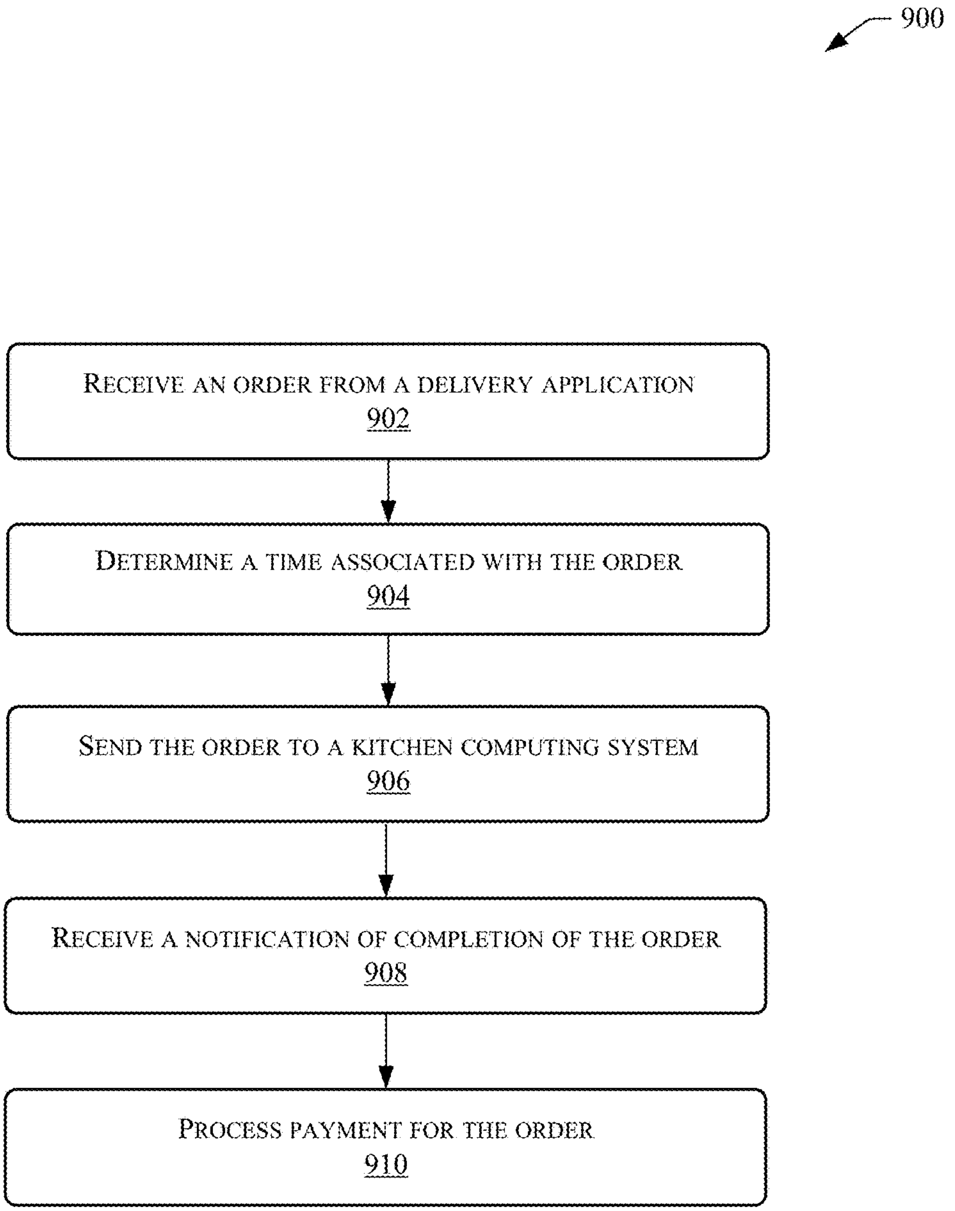
FIG. 9 illustrates a flow diagram of an example process for processing an order from a delivery application.

FIG. 9 illustrates a flow diagram of an example process 900 for processing an order from a remote delivery application.

At 902, the computing device can receive an order from a delivery application. In some example, the computing device can receive one or more delivery applications and/or one or more remote computing devices.

At 904, the computing device can determine a time associated with the order. In various examples, the time can be a preparation time associated with the order. In such examples, the time can be a longest time required to prepare an item in the order. The time can be determined based on a quantity (e.g., number) of employees working in the kitchen, a particular employee working in the kitchen, an upcoming shift change in the kitchen, a cooking time for the items in the order, an ingredient preparation time for items in the order, and other factors affecting a preparation time associated with the order. In various examples, the preparation time can be based on a pre-determined time stored in the computing device for a particular item in the order. In such examples, the computing device can include a list of menu items and associated preparation times.

In some examples, the computing device can determine a time associated with each item in the order. In such examples, the computing device can sequence the items of the order individually, to coordinate the completion of each item in the order to be at substantially the same time.

In various examples, the time can be associated with one or more factors external to the merchant operation. The one or more factors can include weather, traffic (e.g., in proximity to a merchant location, between the customer and the merchant location, etc.), courier availability, other pending order pick-ups or deliveries of the courier, and other factors affecting a time in which a courier may arrive at the merchant location.

At 906, the computing device can send the order to a kitchen computing system (e.g., kitchen display system). In some examples, the order can be sequenced with one or more other orders and/or one or more items of the order and/or one or more other orders.

In various examples, the computing device can receive an indication from the kitchen computing system that there is a delay in processing the order. The indication can be based on a staffing in the kitchen being below a pre-defined minimum quantity (e.g., number) of employees (e.g., a threshold minimum quantity), a pending shift change, a particular employee working in the kitchen, a training evolution, an increase in orders received from the dining room, or other factors that may affect a preparation time of an order. In some examples, the computing system can calculate an updated time associated with the order based on the indication. In various examples, the computing system can send the updated time to the respective delivery application. In some examples, the updated time may be sent to the respective delivery application based on a determination that a difference between the time and the updated time exceeds a threshold amount of time (e.g., 5 minutes, 7 minutes, 10 minutes, etc.).

In some examples, responsive to receiving the indication that there is a delay in processing the order, the computing device can send a notification to a manager of the merchant. In such examples, the notification can include details regarding the delay, a request to address a cause of the delay, a solution to the cause of the delay (e.g., more employees needed in the kitchen, etc.), and the like. For example, the notification to the manager can include a delay in processing the order based on training currently happening in the kitchen. The notification can include a suggestion to terminate the training early, to allow one or more employees to direct full attention to processing orders.

At 908, the computing device can receive a notification of completion of the order from the kitchen computing system. In some examples, the computing device can send the notification of order completion to the delivery application and/or the remote computing device. In such examples, the delivery application and/or the remote computing device can notify a customer and/or a courier associated with the order that the order is ready for pick-up. In various examples, the computing device can send the notification of order completion directly to the courier associated with the order, informing the courier that the order is ready for pick-up.

In various examples, the computing device can also receive a notification of an understock of a particular item from the kitchen computing system. In such examples, the kitchen computing system can determine that the completion of the order resulted in a decrease in a stock of the particular item below a threshold level. In some examples, the computing device can determine an understock situation by comparing one or more items of the order to the notification of completion of the order. In various examples, responsive to the notification of the understock and/or a determination of the understock situation, the computing device can automatically send an order for the particular item to a supplier of menu items. In some examples, responsive to the notification of the understock and/or a determination of the understock situation, the computing device can automatically send a notification of unavailability of the particular item to the delivery application. In such examples, the delivery application can modify a menu to remove the particular item from a menu.

At 910, the computing device can process payment for the order. In some examples, the computing device can process the payment based at least in part on the notification of order completion. In various examples, the computing device can receive payment instrument information concurrently with the order. In such examples, the computing device can temporarily store the payment instrument information until payment is processed. In some examples, the computing device can access payment instrument information stored in a customer profile corresponding to the customer associated with the order.

Figure 10:
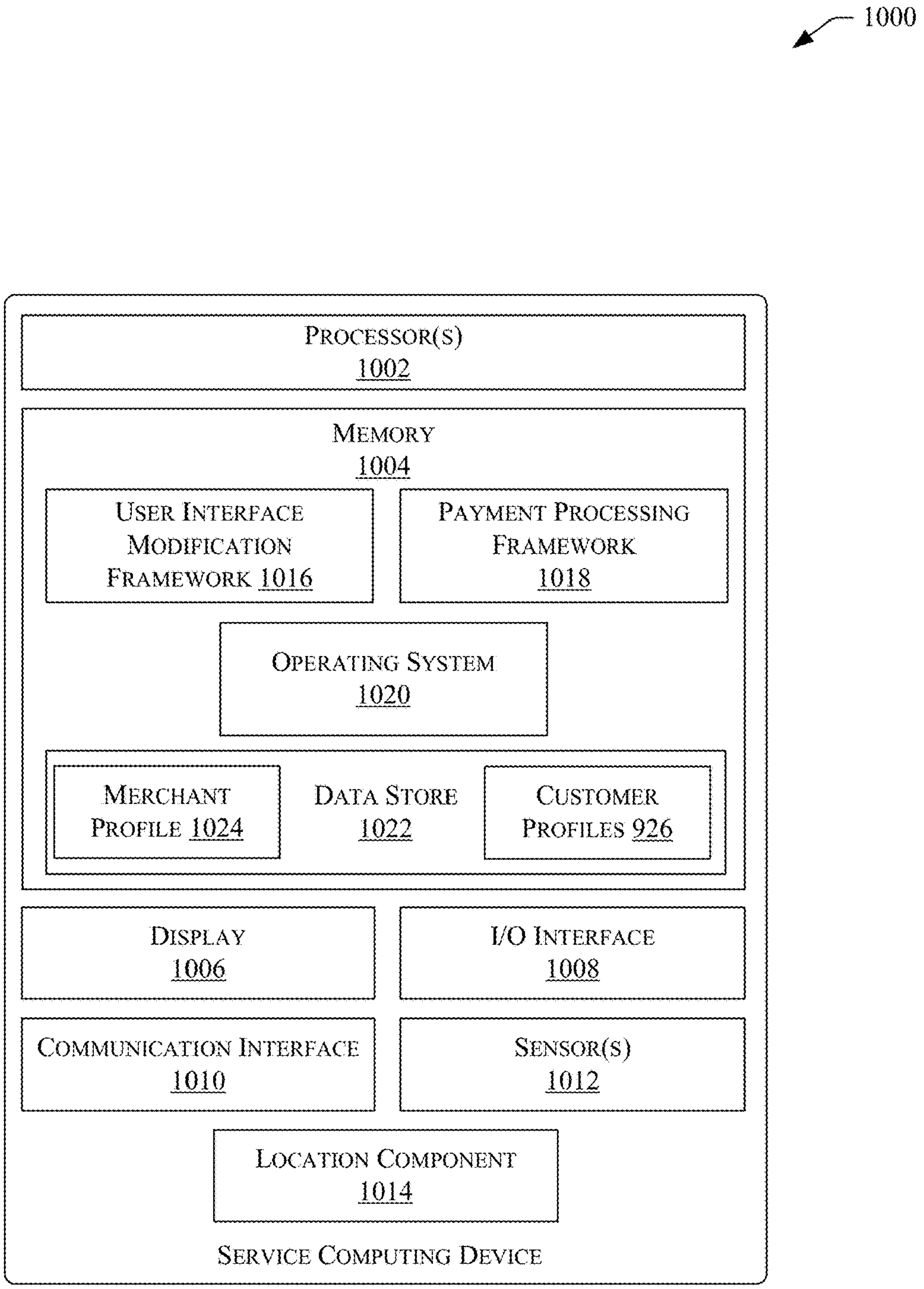
FIG. 10 illustrates select components of an example service computing device configured with the dynamically modifiable user interface system.

FIG. 10 illustrates select components of an example service computing device 1000 configured with the dynamically modifiable user interface system. The service computing device 1000 may be any suitable type of computing device, e.g., mobile, semi-mobile, semi-stationary, or stationary.

Some examples of the service computing device 1000 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the service computing device 1000 includes at least one processor 1002, at least one memory 1004, a display 1006, one or more input/output (I/O) interfaces 1008, one or more communication interfaces 1010, one or more sensor(s) 1012, and at least one location component 1014.

Each processor 1002 may itself comprise one or more processors or processing cores. For example, the processor 1002 can be implemented as one or more microprocessors, microcomputers, microcontrollers, digital signal processors, central processing units, state machines, logic circuitries, and/or any devices that manipulate signals based on operational instructions. In some cases, the processor 1002 may be one or more hardware processors and/or logic circuits of any suitable type specifically programmed or configured to execute the algorithms and processes described herein. The processor 1002 can be configured to fetch and execute computer-readable processor-executable instructions stored in the memory 1004.

Depending on the configuration of the service computing device 1000, the memory 1004 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 1004 may include, but is not limited to, RAM, ROM, EEPROM, flash memory, solid-state storage, magnetic disk storage, optical storage, and/or other computer-readable media technology. Further, in some cases, the service computing device 1000 may access external storage, such as RAID storage systems, storage arrays, network attached storage, storage area networks, cloud storage, or any other medium that can be used to store information and that can be accessed by the processor 1002 directly or through another computing device or network. Accordingly, the memory 1004 may be computer storage media able to store instructions, modules or components that may be executed by the processor 1002. Further, when mentioned, non-transitory computer-readable media excludes media such as energy, carrier signals, electromagnetic waves, and signals per se.

The memory 1004 may be used to store and maintain any number of functional components that are executable by the processor 1002. In some implementations, these functional components comprise instructions or programs that are executable by the processor 1002 and that, when executed, implement operational logic for performing the actions and services attributed above to the service computing device 1000. Functional components of the service computing device 1000 stored in the memory 1004 may include a user interface modification framework 1016 and a payment processing framework 1018. The user interface modification framework 1016 may be configured to analyze contextual data and modify one or more icons of the user interface based on the contextual data, as discussed above with regard to FIGS. 1-7.

In various examples, the payment processing framework 1018 can be configured to communicate one or more orders to a base station computing device (e.g., a centralized computing device) for processing. In such examples, the base station computing device can process the payment via a POS system service provider, a bank corresponding to the payment instrument, and/or another source. In some examples, the payment processing framework 1018 can be configured to receive payment instrument information from the one or more sensor(s) 1012, such as a payment instrument reader. In still yet other examples, the payment processing framework 1018 can be configured to access payment instrument information for a particular customer stored in the customer profiles 1026. In such an example, the service computing device 1000 can automatically process payment based on an indication of order completion.

Additional functional components may include an operating system 1020 for controlling and managing various functions of the service computing device 1000 and for enabling basic user interactions with the service computing device 1000 and/or a customer device. The memory 1004 may also store a data store 1022. The data store 1022 may be configured to store merchant profile 1024, customer profiles 1026 and/or other information pertaining to merchants and associated customers.

In addition, the memory 1004 may also store data, data structures and the like, that are used by the functional components. Depending on the type of the service computing device 1000, the memory 1004 may also optionally include other functional components and data, which may include programs, drivers, etc., and the data used or generated by the functional components. Further, the service computing device 1000 may include many other logical, programmatic and physical components, of which those described are merely examples that are related to the discussion herein.

The one or more communication interface(s) 1010 may include one or more interfaces and hardware components for facilitating communication with various other devices over a network or directly. For example, communication interface (s) 1010 may facilitate communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

In various examples, the one or more communication interface(s) 1010 may work in conjunction with the user interface modification framework. For example, the service computing device may receive a phone call via a network connection. Responsive to answering the phone call, the service computing device 1000 may automatically modify a user interface to display icons corresponding to a menu. In various examples, the service computing device 1000 may recognize a phone number corresponding to the incoming call, and may identify a particular customer profile associated with the customer stored in the customer profiles 1026 of the data store 1022. In such examples, the service computing device 1000 may modify the icons based on one or more customer preferences and/or a transaction history of the customer stored in the particular customer profile.

FIG. 10 further illustrates that the service computing device 1000 may include one or more displays 1006 mentioned above. Depending on the type of computing device used as the service computing device 1000, the one or more displays 1006 may employ any suitable display technology. For example, the one or more displays 1006 may be liquid crystal displays, plasma displays, light emitting diode displays, OLED (organic light-emitting diode) displays, electronic paper displays, or any other suitable type of displays able to present digital content thereon. However, implementations described herein are not limited to any particular display technology.

The I/O interfaces 1008, meanwhile, may include speakers, a microphone, a camera, and various user controls (e.g., buttons, a joystick, a keyboard, a keypad, etc.), a haptic output device, and so forth.

In various examples, the service computing device 1000 can include one or more sensor(s) 1012. The one or more sensor(s) 1012 can include a camera, a laser scanner, a RADAR, a LIDAR, other proximity sensor, an accelerometer, a gyroscope, a compass, a light sensor, a volume sensor, a payment instrument reader, or other sensor capable of capturing and/or analyzing environmental factors.

The location component 1014 may include a GPS device able to indicate location information, or the location component 1014 may comprise another other location-based sensor. Additionally, the service computing device 1000 may include various other components that are not shown, examples of which include removable storage, a power control unit, and so forth.

Figure 11:
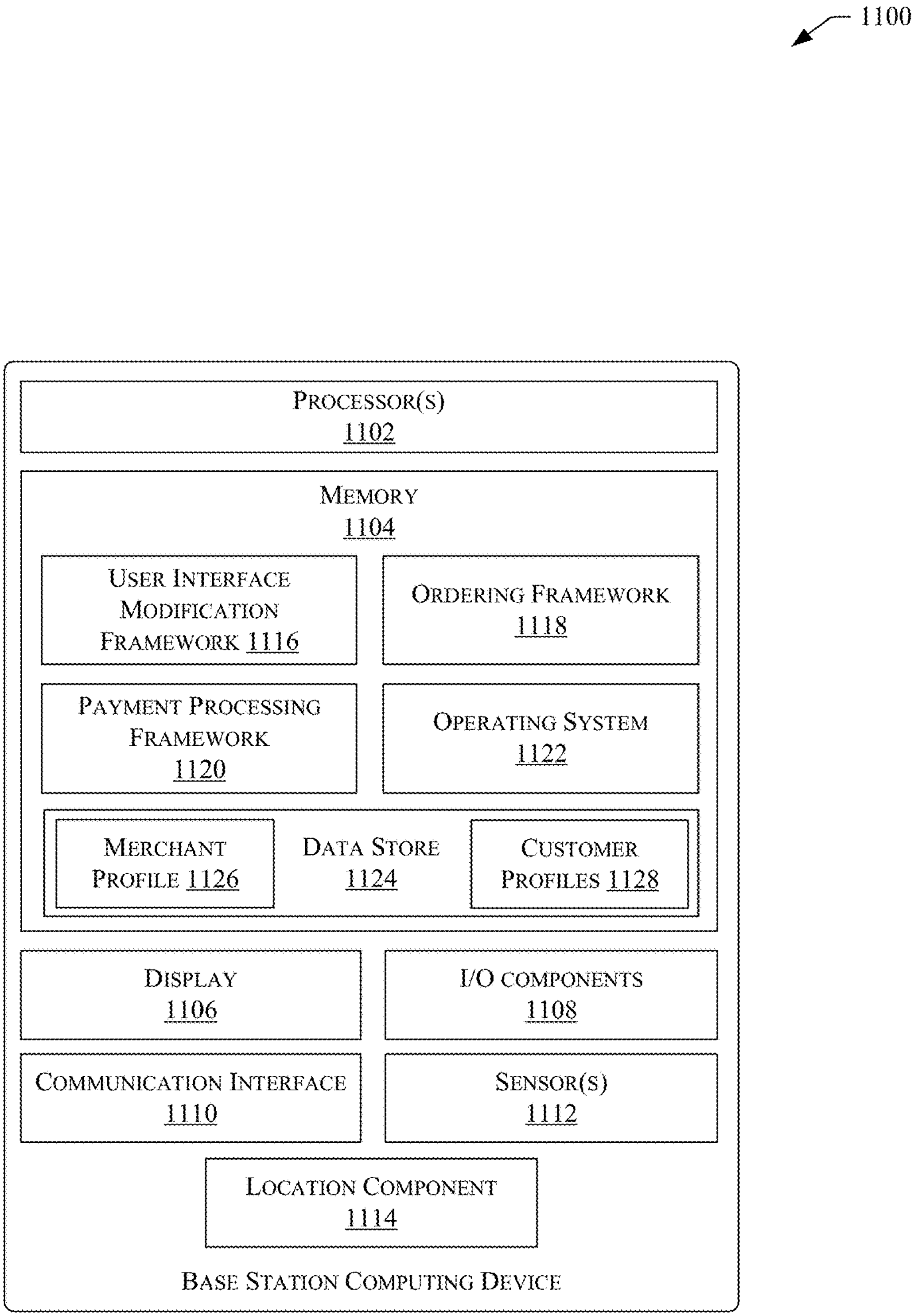
FIG. 11 illustrates select components of an example base station computing system a POS system may use to process orders from one or more other computing devices.

FIG. 11 illustrates select components of an example base station computing device 1100 that a POS system may use as a centralized computing device for the dynamically modifiable user interface system and/or an order prioritization system. The base station computing device 1100 may be any suitable type of computing device, e.g., mobile, semi-mobile, semi-stationary, or stationary.

Some examples of the base station computing device 1100 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the base station computing device 1100 includes at least one processor 1102, at least one memory 1104, a display 1106, one or more input/output (I/O) interfaces 1108, one or more communication interfaces 1110, one or more sensor(s) 1112 at least one location component 1114.

Each processor 1102 may itself comprise one or more processors or processing cores. For example, the processor 1102 can be implemented as one or more microprocessors, microcomputers, microcontrollers, digital signal processors, central processing units, state machines, logic circuitries, and/or any devices that manipulate signals based on operational instructions. In some cases, the processor 1102 may be one or more hardware processors and/or logic circuits of any suitable type specifically programmed or configured to execute the algorithms and processes described herein. The processor 1102 can be configured to fetch and execute computer-readable processor-executable instructions stored in the memory 1104.

Depending on the configuration of the base station computing device 1100, the memory 1104 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 1104 may include, but is not limited to, RAM, ROM, EEPROM, flash memory, solid-state storage, magnetic disk storage, optical storage, and/or other computer-readable media technology. Further, in some cases, the base station computing device 1100 may access external storage, such as RAID storage systems, storage arrays, network attached storage, storage area networks, cloud storage, or any other medium that can be used to store information and that can be accessed by the processor 1102 directly or through another computing device or network. Accordingly, the memory 1104 may be computer storage media able to store instructions, modules or components that may be executed by the processor 1102. Further, when mentioned, non-transitory computer-readable media excludes media such as energy, carrier signals, electromagnetic waves, and signals per se.

The memory 1104 may be used to store and maintain any number of functional components that are executable by the processor 1102. In some implementations, these functional components comprise instructions or programs that are executable by the processor 1102 and that, when executed, implement operational logic for performing the actions and services attributed above to the base station computing device 1100. Functional components of the base station computing device 1100 stored in the memory 1104 may include user interface modification framework 1116, such as user interface modification framework 1016, discussed above, and an ordering framework 1118.

In various examples, the ordering framework 1118 can include an ordering hub for processing multiple orders. The multiple orders can be from the single computing device, such as a server computing device 1000, or from multiple computing devices. In some examples, at least some of the multiple orders can be received from one or more delivery applications (e.g., applications configured to process delivery orders from one or more customers).

In various examples, the ordering framework 1118 can receive an order, and determine a preparation time associated with the order. The preparation time can be based on a longest cooking time for the order, a quantity (e.g., number) of employees working in the kitchen, the particular employees working in the kitchen, an upcoming employee shift change, how busy the dining room is, a quantity of orders currently in a sequence queue, and other factors affecting a time it would take to prepare an order.

In some examples, the ordering framework 1118 can receive a plurality of orders, and can determine a sequence of the plurality of orders. The sequence can be based on an arrival time of the order, the preparation time associated with the order, location of the customer (e.g., at the merchant location or at a remote location), a pick-up time associated with the order (e.g., pre-determined pick-up time, delays due to traffic, weather, courier availability, etc.), and/or other factors.

In various examples, the ordering framework 1118 receive a plurality of orders, and can determine a sequence of sub-orders within the orders. In such examples, the items in the orders can be separated, and a preparation time of each item can be determined. Based on the preparation time of each item, the items of the various orders can be sequenced for efficiency. For example, two orders may be received substantially simultaneously, each of the orders including a salad and a hot entrée. The ordering framework 1118 can determine a preparation time for the salads is 3 minutes and a preparation time for the hot entrées is 20 minutes. Based on the preparation times, the ordering framework 1118 can sequence the items of the orders so that the salads and corresponding hot entrées are ready at substantially the same time.

In some examples, the ordering framework 1118 can determine a long preparation time and/or a delay for a particular item. In various examples, the ordering framework 1118 can communicate the information to the various delivery applications and/or remote computing devices. In such examples, the delivery applications and/or remote computing devices can de-emphasize the item, such as by modifying an icon corresponding to the item on a menu, and/or provide a notification of delay regarding the item and consequently a delay of an order including the item. In some examples, the ordering framework 1118 can communicate the information to the user interface modification framework 1116. Based on the information about the delay, the user interface modification framework 1116 can de-emphasize the item, such as by removing the icon associated therewith from a main page, making the icon smaller, and the like.

In various examples, the ordering framework 1118 and/or user interface modification framework 1116 can monitor merchant inventory. In such examples, the ordering framework 1118 and/or user interface modification framework 1116 can update the merchant inventory (e.g., update a data structure, database, etc. associated with the inventory) based on processed orders. The updates can be performed continuously (e.g., with each order) and/or periodically (e.g., at a given time each day, every hour, etc.).

In various examples, the ordering framework 1118 and/or user interface modification framework 1116 can monitor the merchant inventory, and communicate the merchant inventory to the service computing device. In some examples, the ordering framework 1118 and/or user interface modification framework 1116 can push an update to the service computing device based on a determination that a particular item in the inventory has exceeded an overstock threshold level. The overstock threshold level may be set by the merchant, such as in merchant profile 1126, and/or by a POS system service provider. For example, the ordering framework 1118 and/or user interface modification framework 1116 may determine that a particular item is overstocked. Based on the overstock determination, the base station computing device 1100 may instruct the service computing device to modify the user interface to emphasize the overstocked item in an attempt to sell more of that item.

In some examples, the ordering framework 1118 and/or user interface modification framework 1116 can send a notification to the delivery applications and/or remote computing devices based on the overstock determination. The notification can include an instruction to emphasize the item, a discount offered on the item, or other information to encourage the sale of the item.

In some examples, the ordering framework 1118 and/or user interface modification framework 1116 can push an inventory update (e.g., update a quantity of a particular item or group of items in the inventory, current quantities of inventory items in the data structure, database, etc.) to the service computing device based on a determination that a particular item in the inventory has decreased below an understock threshold level. The understock threshold level could be zero (0) remaining items, or a limited quantity of remaining items, as determined by the merchant, such as in merchant profile 1126, and/or by a POS system service provider. For example, the ordering framework 1118 and/or the user interface modification framework 1116 may determine that a particular item is understocked (e.g., a limited amount or none remaining). Based on the understock determination, the ordering framework 1118 and/or the user interface modification framework 1116 send an instruction to the service computing device to de-emphasize the understocked item in an attempt to discourage the sale of the item and/or attempt to cross-sell another item, such as by emphasizing a comparable item.

In some examples, the ordering framework 1118 and/or user interface modification framework 1116 can send a notification to the delivery applications and/or remote computing devices based on the understock determination. The notification can include an instruction to de-emphasize the item, remove the item from the menu, attempt to cross-sell another item, such as by emphasizing a comparable item, or other instruction and/or information to discourage the sale of the item.

In various examples, the memory 1104 can include a payment processing framework 1120. In such examples, the payment processing framework 1120 can be configured to receive payment information from a service computing device, delivery application, and/or other remote computing devices. The payment processing framework 1120 can process the payment via a POS system service provider, a bank corresponding to the payment instrument, and/or another source. In some examples, the payment processing framework 1120 can be configured to receive payment instrument information from the one or more sensor(s) 1112, such as a payment instrument reader. In still yet other examples, the payment processing framework 1120 can be configured to access payment instrument information for a particular customer stored in the customer profiles 1126. In such an example, the base station computing device 1100 can automatically process payment based on an indication of order completion.

Additional functional components may include an operating system 1122 for controlling and managing various functions of the base station computing device 1100 and for enabling basic user interactions with the base station computing device 1100 and/or a customer device. The memory 1104 may also store a data store 1124. The data store 1124 may be configured to store a merchant profile 1126, customer profiles 1128 and/or other information pertaining to the merchant and associated customers.

In addition, the memory 1104 may also store data, data structures and the like, that are used by the functional components. Depending on the type of the base station computing device 1100, the memory 1104 may also optionally include other functional components and data, which may include programs, drivers, etc., and the data used or generated by the functional components. Further, the base station computing device 1100 may include many other logical, programmatic and physical components, of which those described are merely examples that are related to the discussion herein.

The one or more communication interface(s) 1110 may include one or more interfaces and hardware components for facilitating communication with various other devices over a network or directly. For example, communication interface (s) 1110 may facilitate communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 11 further illustrates that the base station computing device 1100 may include one or more displays 1106 mentioned above. Depending on the type of computing device used as the base station computing device 1100, the one or more displays 1106 may employ any suitable display technology. For example, the one or more displays 1106 may be liquid crystal displays, plasma displays, light emitting diode displays, OLED (organic light-emitting diode) displays, electronic paper displays, or any other suitable type of displays able to present digital content thereon. However, implementations described herein are not limited to any particular display technology.

The I/O interfaces 1108, meanwhile, may include speakers, a microphone, a camera, and various user controls (e.g., buttons, a joystick, a keyboard, a keypad, etc.), a haptic output device, and so forth.

In various examples, the base station computing device 1100 can include one or more sensor(s) 1112. The one or more sensor(s) 1112 can include a camera, a laser scanner, a RADAR, a LIDAR, other proximity sensor, an accelerometer, a gyroscope, a compass, a light sensor, a volume sensor, or other sensor capable of capturing and/or analyzing environmental factors.

The location component 1114 may include a GPS device able to indicate location information, or the location component 1114 may comprise another other location-based sensor. Additionally, the base station computing device 1100 may include various other components that are not shown, examples of which include removable storage, a power control unit, and so forth.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A computer-implemented process comprising:

receiving, by one or more computer servers of a service provider, menu data comprising an indication of a plurality of menu items offered for sale by a merchant;

based at least in part on the menu data, sending, by the one or more computer servers to one or more devices, first instructions that cause presentation of a user interface comprising a plurality of icons, wherein an individual icon of the plurality of icons corresponds to a respective item of the plurality of menu items, and wherein individual devices of the one or more devices are associated with at least one of the merchant or a customer of the merchant and configured to receive customer orders for one or more menu items;

receiving, by the one or more computer servers, an indication that an item of the plurality of menu items is temporarily unavailable for sale by the merchant; and responsive to receiving the indication that the item is temporarily unavailable, sending, by the one or more computer servers to at least one device of the one or more devices, second instructions that cause modification of the user interface to an updated user interface by superimposing a notification on an icon corresponding to the first item, wherein the notification indicates that the item is temporarily unavailable for sale, and wherein the notification partially occludes the icon while leaving the icon at least partially visible and legible on the updated user interface.

2. The computer-implemented process of claim 1, wherein the indication that the item is temporarily unavailable for sale by the merchant comprises a user input to a merchant device, wherein the user input comprises an indication that the item is out of stock.

3. The computer-implemented process of claim 1, wherein receiving the indication that the item is temporarily unavailable for sale by the merchant comprises determining that the item is temporarily unavailable via monitoring an inventory of the merchant via communication with one or more computing devices associated with the merchant.

4. The computer-implemented process of claim 1, wherein the item is temporarily unavailable for sale by the merchant at one merchant location of a plurality of merchant locations, wherein the indication that the item is temporarily unavailable for sale by the merchant includes location data indicating that the item is temporarily unavailable at the one merchant location, and wherein the at least one device is associated with the one merchant location.

5. The computer-implemented process of claim 1, wherein the indication that the item is temporarily unavailable for sale by the merchant comprises an indication that the item is unavailable for sale during at least one of a time of day, a day of week, a season, or a holiday period.

6. The computer-implemented process of claim 1, wherein sending the second instructions happens in near real-time to receiving the indication that the item is temporarily unavailable for sale.

7. The computer-implemented process of claim 1, wherein individual icons of the plurality of icons are selectable icons, and wherein selection of a selectable icon causes an order to be generated for a corresponding item of the plurality of menu items.

8. The computer-implemented process of claim 1, wherein the modification of the user interface further comprises at least one of:

a changed position of the icon;

a changed size of the icon;

a changed shape of the icon;

a changed image associated with the icon; or changed text associated with the icon.

9. A system associated with a service provider, comprising:

one or more processors; and one or more non-transitory computer-readable media storing instructions executable by the one or more processors, wherein the instructions cause the one or more processors to perform acts comprising:

receiving menu data comprising an indication of a plurality of menu items offered for sale by a merchant;

based at least in part on the menu data, sending, to one or more devices, first instructions that cause presentation of a user interface comprising a plurality of icons, wherein an individual icon of the plurality of icons corresponds to a respective item of the plurality of menu items, and wherein individual devices of the one or more devices are associated with at least one of the merchant or a customer of the merchant and configured to receive customer orders for one or more menu items;

receiving an indication that an item of the plurality of menu items is temporarily unavailable for sale by the merchant; and responsive to receiving the indication that the item is temporarily unavailable, sending, to at least one device of the one or more devices, second instructions that cause modification of the user interface to an updated user interface by superimposing a notification on an icon corresponding to the first item, wherein the notification indicates that the item is temporarily unavailable for sale, and wherein the notification partially occludes the icon while leaving the icon at least partially visible and legible on the updated user interface.

10. The system of claim 9, wherein the indication that the item is temporarily unavailable for sale by the merchant comprises a user input to a merchant device, wherein the user input comprises an indication that the item is out of stock.

11. The system of claim 9, wherein receiving the indication that the item is unavailable for sale by the merchant comprises determining that the item is unavailable via monitoring an inventory of the merchant via communication with one or more computing devices associated with the merchant.

12. The system of claim 9, wherein the item is temporarily unavailable for sale by the merchant at one merchant location of a plurality of merchant locations, wherein the indication that the item is temporarily unavailable for sale by the merchant includes location data indicating that the item is temporarily unavailable at the one merchant location, and wherein the at least one device is associated with the one merchant location.

13. The system of claim 9, wherein the indication that the item is temporarily unavailable for sale comprises an indication that the item is temporarily unavailable for sale during at least one of a time of day, a day of week, a season, or a holiday period.

14. The system of claim 9, wherein sending the second instructions happens in near real-time to receiving the indication that the item is temporarily unavailable for sale.

15. One or more non-transitory computer-readable media storing instructions executable by one or more processors that, when executed by the one or more processors, cause the one or more processors to perform acts comprising:

receiving, by one or more computer servers of a service provider, menu data comprising an indication of a plurality of menu items offered for sale by a merchant;

based at least in part on the menu data, sending, by the one or more computer servers to one or more devices, first instructions that cause presentation of a user interface comprising a plurality of icons, wherein an individual icon of the plurality of icons corresponds to a respective item of the plurality of menu items, and wherein individual devices of the one or more devices are associated with at least one of the merchant or a customer of the merchant and configured to receive customer orders for one or more menu items;

receiving, by the one or more computer servers, an indication that an item of the plurality of menu items is temporarily unavailable for sale by the merchant; and responsive to receiving the indication that the item is temporarily unavailable, sending, by the one or more computer servers to at least one device of the one or more devices, second instructions that cause modification of the user interface to an updated user interface by superimposing a notification on an icon corresponding to the first item, wherein the notification indicates that the item is temporarily unavailable for sale, and wherein the notification partially occludes the icon while leaving the icon at least partially visible and legible on the updated user interface.

16. The one or more non-transitory computer-readable media of claim 15, wherein the modification of the user interface further comprises at least one of:

a changed position of the icon;

a changed size of the icon;

a changed shape of the icon;

a changed image associated with the icon; or changed text associated with the icon.

17. The one or more non-transitory computer-readable media of claim 15, wherein the second instructions that cause modification of the user interface are sent after receiving an indication of an initial interaction with the user interface.

18. The one or more non-transitory computer-readable media of claim 15, wherein the modification of the user interface further comprises a changed color of the icon.

19. The one or more non-transitory computer-readable media of claim 15, wherein the icon is in a same position on the updated user interface and on the user interface.

20. The one or more non-transitory computer-readable media of claim 15, wherein icon in the updated user interface is non-interactable.

* * * * *